US007623602B2

(12) United States Patent  
Guess et al.

(10) Patent No.: US 7,623,602 B2
(45) Date of Patent: Nov. 24, 2009

(54) ITERATIVE INTERFERENCE CANCELLER FOR WIRELESS MULTIPLE-ACCESS SYSTEMS EMPLOYING CLOSED LOOP TRANSMIT DIVERSITY

(75) Inventors: Tommy Guess, Lafayette, CO (US); Michael L McCloud, Boulder, CO (US)

(73) Assignee: Tensorcomm, Inc., Greenwood, CO (US)

( * ) Notice: Subject to any disclaimer, the term of this patent is extended or adjusted under 35 U.S.C. 154(b) by 621 days.

(21) Appl. No.: 11/509,920

(22) Filed: Aug. 25, 2006

(65) Prior Publication Data

US 2007/0110137 A1    May 17, 2007

Related U.S. Application Data

(63) Continuation-in-part of application No. 11/451,688, filed on Jun. 13, 2006.

(60) Provisional application No. 60/736,204, filed on Nov. 15, 2005.

(51) Int. Cl.
*H04B 7/10* (2006.01)
(52) U.S. Cl. ..................................................... 375/347
(58) Field of Classification Search .................. 375/347, 375/299
See application file for complete search history.

(56) References Cited

U.S. PATENT DOCUMENTS 5,423,045 A    6/1995    Kannan et al.
5,606,560 A    2/1997    Malek et al.
6,192,067 B1   2/2001    Toda et al.
7,069,050 B2*  6/2006    Yoshida .................... 455/562.1
7,535,969 B2*  5/2009    Catreux et al. .............. 375/267
2002/0009156 A1  1/2002  Hottinen et al.
2002/0118781 A1* 8/2002  Thomas et al. .............. 375/347
2004/0076224 A1  4/2004  Onggosanusi et al.
2004/0095907 A1  5/2004  Agee et al.
2005/0101259 A1  5/2005  Tong et al.
2005/0195889 A1  9/2005  Grant et al.
2006/0229051 A1  10/2006 Narayan et al.

* cited by examiner

*Primary Examiner*—Kevin Y Kim
(74) *Attorney, Agent, or Firm*—Brian McCormick; Neil Mothew; Anand Narayan

(57) ABSTRACT

An interference-canceling receiver processes coded, multiple-access, spread-spectrum transmissions that propagate through frequency-selective communication channels from multiple transmit antennas to multiple receive antennas in a closed-loop transmit-diversity channel. The receiver provides for repeated use of symbol-estimate weighting, subtractive cancellation with a stabilizing step-size, and mixed-decision symbol estimation. Receivers may be designed, adapted, and implemented explicitly in software or programmed hardware, or implicitly in standard Rake-based hardware, either within a Rake receiver at the finger level or outside the Rake at the user or subchannel symbol level. The receiver may be employed in user equipment on the forward link or in a base station on the reverse link.

101 Claims, 16 Drawing Sheets

ITERATIVE INTERFERENCE CANCELLER FOR WIRELESS MULTIPLE-ACCESS SYSTEMS EMPLOYING CLOSED LOOP TRANSMIT DIVERSITY

CROSS-REFERENCE TO RELATED APPLICATIONS

This application claims priority to Provisional U.S. Pat. Appl. Ser. No. 60/736,204, filed Nov. 15, 2005, and entitled "Iterative Interference Cancellation Using Mixed Feedback Weights and Stabilizing Step Sizes," and is a Continuation in Part of U.S. patent application Ser. No. 11/451,688, filed Jun. 13, 2006, and entitled "Iterative Interference Cancellation Using Mixed Feedback Weights and Stabilizing Step Sizes," which are incorporated by reference in their entireties.

BACKGROUND

1. Field of the Invention

The present invention relates generally to cancellation of intra-channel and inter-channel interference in coded spread spectrum wireless communications systems having multiple transmit antennas and employing closed loop channel information fed back from a receiver to a transmitter. More specifically, the invention exploits spatial diversity afforded by multiple transmit and receive antennas, in combination with an interference-cancellation unit that performs symbol-estimate weighting, subtractive cancellation with a stabilizing step-size, and mixed-decision symbol estimation.

2. Discussion of the Related Art

In an exemplary wireless multiple-access system, a communication resource is divided into code-space subchannels allocated to different users. A plurality of subchannel signals received by a wireless terminal (e.g., a subscriber unit or a base station) may correspond to different users and/or different subchannels allocated to a particular user.

If a single transmitter broadcasts different messages to different receivers, such as a base station in a wireless communication system serving a plurality of mobile terminals, the channel resource is subdivided in order to distinguish between messages intended for each mobile. Thus, each mobile terminal, by knowing its allocated subchannel(s), may decode messages intended for it from the superposition of received signals. Similarly, a base station typically separates signals it receives into subchannels in order to differentiate between users.

In a multipath environment, received signals are superpositions of time-delayed and complex-scaled versions of the transmitted signals. Multipath can cause several types of interference. Intra-channel interference occurs when the multipath time-spreading causes subchannels to leak into other subchannels. For example, forward-link subchannels that are orthogonal at the transmitter may not be orthogonal at the receiver. When multiple base stations (or sectors or cells) are active, inter-channel interference may result from unwanted signals received from other base stations. These types of interference can degrade communications by causing a receiver to incorrectly decode received transmissions, thus increasing a receiver's error floor. Interference may degrade communications in other ways. For example, interference may diminish the capacity of a communication system, decrease the region of coverage, and/or decrease maximum data rates. For these reasons, a reduction in interference can improve reception of selected signals while addressing the aforementioned limitations due to interference.

The use of multiple transmit antennas provides flexibility for shaping transmissions and, if intelligently used, allows for interference cancellation to improve receiver performance over what can be accomplished with a single transmit antenna.

Multiple transmit antennas may be employed in a wireless system with the aim of increasing the signal quality at the receiver. This improvement may be obtained by beamforming, in which case the channel linking each transmit and receive antenna pair is measured at the receiver and fed back through a dedicated channel to the transmitter. The transmitter may determine a set of complex weighting coefficients (each corresponding to one antenna) that adapt the phase and/or amplitude of a common information signal transmitted to the receiver across each antenna. The weights may be chosen to maximize power at the receiver, subject to a constraint on the total transmit power. Alternatively, the receiver may calculate the weights, which may be fed back across the dedicated back channel. In this manner, an additional diversity advantage may be gained over the wireless medium and the (average) inter-channel interference may be reduced, as the base stations do not transmit power isotropically to all users in their respective cells.

SUMMARY OF THE INVENTION

In view of the foregoing background, embodiments of the present invention may provide a generalized interference-canceling receiver for canceling intra-channel and/or inter-channel interference in multiple-access, coded-waveform transmissions that are formed by modulating the same information across a plurality of transmit antennas. Each associated transmit-antenna chain introduces a unique user-specific amplitude weight and phase shift to a user-specific waveform, with the purpose of maximizing the signal-to-noise ratio (or the total power) at each user-specific receiver. The transmitted signals propagate through a frequency-selective communication channel and are received by one or more receive antennas. Receiver embodiments may be designed, adapted, and implemented explicitly in software or programmed hardware, or implicitly in standard Rake-based hardware. Embodiments may be employed in user equipment on the downlink or in a base station on the uplink.

According to one embodiment of the invention, a system is configured for canceling interference from signals in a plurality of receive antennas received from a plurality of transmit antennas wherein closed loop transmit waveform shaping is employed. A calculation means comprising a combining means, a despreading means, and a mixed-decision means is configured for determining a set of dominant beamforming weights for transmit antennas of each of a plurality of transmit sources.

The combining means is configured for combining signals from the plurality of receive antennas for each of the plurality of transmit sources for producing a plurality of combined signals. The combining means may include, by way of example, but without limitation, an adder or combiner configured to sum a plurality of input signals.

The despreading means is configured for employing the set of dominant beamforming weights to resolve the plurality of combined signals onto a signal basis for the plurality of transmit sources to produce soft symbol estimates. The despreading means may include, by way of example, but without limitation, a channel estimator, a PN decoder, and a Walsh decoder.

The mixed-decision means is configured for performing a mixed decision on each of the soft symbol estimates to produce initial symbol decisions. The mixed-decision means may include, by way of example, but without limitation, a combination of hardware and software configured to produce soft and/or hard symbol estimates. The mixed-decision means may comprise a de-biasing means configured for scaling the input symbol estimates with a scale factor to remove bias computed on the input symbol estimates. Each de-biased input symbol estimate may be processed irrespective of other symbol estimates to produce a hard decision that quantizes the de-biased input symbol estimate onto a nearby constellation point, or a soft decision that scales the de-biased input symbol estimate.

The system may further comprise a sequential interference cancellation means configured for producing interference-cancelled versions of the initial symbol decisions. In one embodiment, the sequential interference cancellation means comprises a summing means for summing constituent signals for each of the plurality of receive antennas to a corresponding scaled error signal to produce a combined signal, and a resolving means configured for resolving the combined signals across antennas onto the signal basis for the plurality of transmit sources, whereby the resolving is performed with respect to multipath structure determined from the set of dominant beamforming weights.

In another embodiment, the sequential interference cancellation means comprises a Rake-synthesis means configured for producing synthesized Rake finger signals for each of the plurality of receive antennas, the synthesized Rake finger signals emulating signals that would be received in response to weighted symbol decisions being employed by at least one of the plurality of transmit sources, and a subtraction means configured for performing per-antenna subtraction of a sum of the synthesized Rake finger signals from a corresponding received signal to produce an error signal.

In yet another embodiment, the sequential interference cancellation means comprises a resolving means configured for resolving a residual signal from each of the plurality of antennas onto the signal basis for the plurality of transmit sources for producing a plurality of per-antenna resolved signals, a combining means configured for combining the per-antenna resolved signals for producing a combined signal, a stabilizing step size means configured for scaling the combined signals with a stabilizing step size for producing a scaled signal, and a summing means configured for summing weighted input symbol decisions with the scaled signal for generating a set of interference-cancelled constituents.

In another embodiment, the sequential interference cancellation means comprises a weighting module configured for applying soft weights to a plurality of input symbol decisions, a mixed decision module configured for performing mixed decisions on soft symbol estimates, and a step-size module configured to scale a residual signal with a stabilizing step size.

Embodiments of the invention may be employed in any receiver configured to support the standard offered by the $3^{rd}$-Generation Partnership Project 2 (3GPP2) consortium and embodied in a set of documents, including "TR-45.5 Physical Layer Standard for cdma2000 Spread Spectrum Systems," "C.S0005-A Upper Layer (Layer 3) Signaling Standard for cdma2000 Spread Spectrum Systems," and "C.S0024 CDMA2000 High Rate Packet Data Air Interface Specification" (i.e., the CDMA2000 standard). Receivers and cancellation systems described herein may be employed in subscriber-side devices (e.g., cellular handsets, wireless modems, and consumer premises equipment) and/or server-side devices (e.g., cellular base stations, wireless access points, wireless routers, wireless relays, and repeaters). Chipsets for subscriber-side and/or server-side devices may be configured to perform at least some of the receiver and/or cancellation functionality of the embodiments described herein.

Various functional elements, separately or in combination, depicted in the figures may take the form of a microprocessor, digital signal processor, application specific integrated circuit, field programmable gate array, or other logic circuitry programmed or otherwise configured to operate as described herein. Accordingly, embodiments may take the form of programmable features executed by a common processor or a discrete hardware unit.

These and other embodiments of the invention are described with respect to the figures and the following description of the preferred embodiments.

BRIEF DESCRIPTION OF THE DRAWINGS

Embodiments according to the present invention are understood with reference to the following figures:

FIG. 11b shows an equivalent method for calculating the difference signal described with respect to FIG. 11a.

Figure 1:
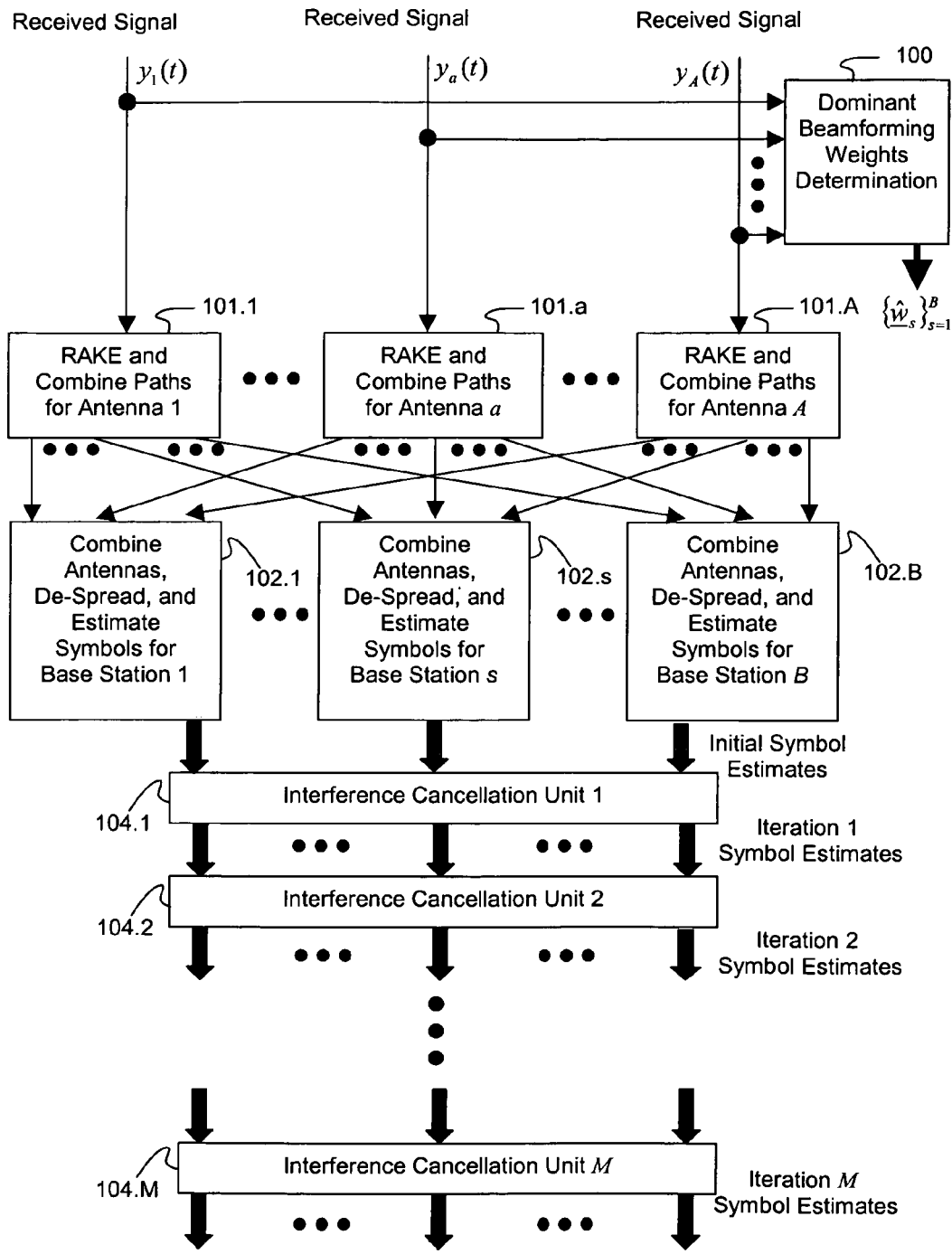
FIG. 1 is a general schematic illustrating an iterative interference canceller in accordance with one embodiment of the invention.

Various functional elements or steps, separately or in combination, depicted in the figures may take the form of a microprocessor, digital signal processor, application specific integrated circuit, field programmable gate array, or other logic circuitry programmed or otherwise configured to operate as described herein. Accordingly, embodiments may take the form of programmable features executed by a common processor or discrete hardware unit.

DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The following formula represents an analog baseband signal received by antenna a from multiple base stations employing CLTD when a single symbol is transmitted by each user on each symbol period (corresponding to vector-valued beam forming):

$$y_a(t) = \sum_{s=1}^{B} \sum_{n=1}^{N} \sum_{l=1}^{L_{a,s,n}} \alpha_{a,s,n,l} \sum_{k=1}^{K_s} w_{s,n,k} b_{s,k} u_{s,k}(t - \tau_{a,s,n,l}) + n_a(t), \quad \text{Equation 1}$$

$$t \in (0, T),$$

with the following definitions
- a represents the $a^{th}$ antenna of the mobile and ranges from 1 to A;
- (0, T) is the symbol interval;
- B is the number of modeled transmit sources, or base stations, indexed by the subscript s, which ranges from 1 to B, wherein the term "transmit source" or "base station" may include cells or sectors;
- N is the number of transmit antennas employed by each base station;
- $L_{a,s,n}$ is the number of resolvable (or modeled) paths from the $n^{th}$ transmit antenna of base station s to antenna a of the mobile, and is indexed from 1 to $L_{a,s,n}$;
- $\alpha_{a,s,n,l}$ and $\tau_{a,s,n,l}$ are the complex gain and delay, respectively, associated with the $l^{th}$ path from the $n^{th}$ transmit antenna of base station s to antenna a of the mobile;
- $K_s$ is the number of active users or code waveform subchannels in base station s sharing the channel via code-division multiplexing, indexed from 1 to $K_s$;
- $u_{s,k}(t)$ is the code waveform (e.g., spreading waveform) of base station s used to carry the $k^{th}$ user's symbol for that base station on all transmit antennas (e.g., a chip waveform modulated by a user-specific Walsh code and covered with a base-station specific PN cover; the framework, though, is general and is not limited to any particular type of code waveforms);
- $w_{s,n,k}$ is the weighting coefficient applied to the $k^{th}$ user of base station s prior to transmission from antenna n;
- $b_{s,k}$ is the complex symbol being transmitted for the $k^{th}$ user of base station s; and
- $n_a(t)$ is zero-mean complex additive noise on the $a^{th}$ antenna that contains both thermal noise and any interference whose structure is not explicitly modeled (e.g., inter-channel interference from unmodeled base stations and intra-channel interference from unmodeled paths).

If the beamforming weights $w_{s,n,k}$ for all active users in all base stations are known at the receiver, such as would be the case for a closed loop uplink communication link, then the basic approach described in U.S. patent application Ser. No. 11/451,688 and U.S. patent application Ser. No. 11/491,674, filed Jul. 24, 2006 (which are hereby incorporated by reference) may be applied. Each user employs a distinct Rake filter matched to the effective multiple-input multiple-output channel that maps the transmitter to the receiver. Similarly, each user may employ a distinct analysis module matched to its channel to generate interference signals for use in cancellation.

FIG. 1 illustrates components of a receiver in accordance with one embodiment of the invention. A beam-forming weight determination module 100 determines the vector-valued dominant beam pattern weights $\{\hat{\underline{w}}_s\}$ from each transmitter (e.g., base station) s to the receiver, generally with the aid of pilot symbols. In practice, the weight vector $\{\hat{\underline{w}}_s\}$ will be different for each user served by basestation s. However, since a mobile receiver will know the weight only for its own subchannel, it can be approximated that all other subchannels will use the same weighting vector. Thus, the weights $\hat{\underline{w}}_s$ may be defined to be $\hat{\underline{w}}_s = [w_{s,1,1}, \ldots, w_{s,N,1}]^H$ for all subchannels from 1 to $K_s$.

The vector $\hat{\underline{w}}_s$ is the transmit weighting vector that would be requested by mobile number 1 from base station s. However, the mobile may not actually receive data from this particular base station. For example, the impulse response of the (discrete) channel linking the $n^{th}$ transmit antenna of base station s and receive antenna a after sampling the received data may be denoted by $\underline{h}_{a,s,n}$. The set of transmit weights that maximize the received power at the mobile from this base station are given by the solution to the following quadratic optimization problem $$\hat{\underline{w}}_s = \operatorname*{argmax}_{\underline{w}: \underline{w}^*\underline{w} = 1} \begin{bmatrix} w_1 \\ w_2 \\ \vdots \\ w_N \end{bmatrix}^* \left( \sum_{a=1}^{A} \begin{bmatrix} \underline{h}_{a,s,1}^* \underline{h}_{a,s,1} & \underline{h}_{a,s,1}^* \underline{h}_{a,s,2} & \cdots & \underline{h}_{a,s,1}^* \underline{h}_{a,s,N} \\ \underline{h}_{a,s,2}^* \underline{h}_{a,s,1} & \underline{h}_{a,s,2}^* \underline{h}_{a,s,2} & \cdots & \underline{h}_{a,s,2}^* \underline{h}_{a,s,N} \\ \vdots & \vdots & \ddots & \vdots \\ \underline{h}_{a,s,N}^* \underline{h}_{a,s,1} & \underline{h}_{a,s,N}^* \underline{h}_{a,s,2} & \cdots & \underline{h}_{a,s,N}^* \underline{h}_{a,s,N} \end{bmatrix} \right) \begin{bmatrix} w_1 \\ w_2 \\ \vdots \\ w_N \end{bmatrix},$$

which may be solved by standard techniques (e.g. Rayleigh quotients). Other formulations of this problem, such as maximizing the received signal-to-noise ratio, may result in different choices for the weights values $\hat{\underline{w}}_s$. All users from base station s are processed under the assumption that they employ this common transmit pattern $\hat{\underline{w}}_s$. This assumption accurately models the dominant interferers (those that happen to employ this beam pattern). Furthermore, the use of soft weights indicating received quality of each users' symbols will tend to remove those users for which this match is bad.

The received signals on each antenna are processed by a corresponding primary front-end processor 101.1-101.A comprising a Rake matched to the dominant transmit beam pattern and a maximal ratio combiner. The outputs of the primary front-end processors 101.1-101.A are organized by base station and processed by secondary front-end processors 102.1-102.B in which the outputs are combined across receive antennas and then resolved onto the users' code waveforms via de-spreading so that initial symbol estimates can be determined. The symbol estimates form the inputs into the first of a sequence of interference cancellation units (ICUs) 104.1-104.M. Each ICU 104.1-104.M mitigates intra-channel and inter-channel interference in the estimates in order to produce improved symbol estimates.

Figure 2:
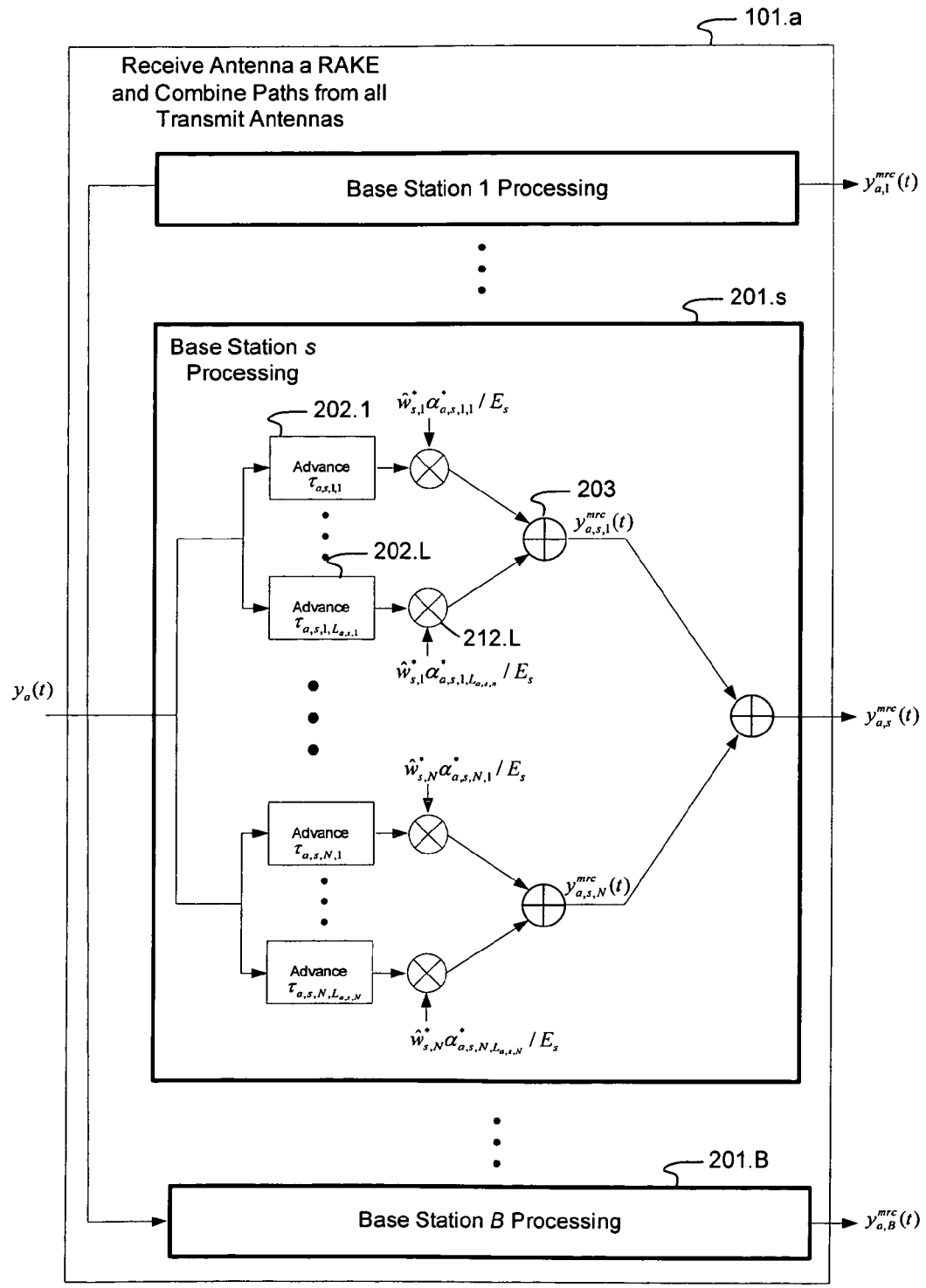
FIG. 2 is a block diagram of a per-antenna front-end Rake and combiner employing dominant beamforming reception.

FIG. 2 is a block diagram of a per-antenna front-end Rake and combiner, such as the Rake/Combiner 101.a shown in FIG. 1, employing dominant beamforming reception. A plurality of processing elements 201.1-201.B, each associated with one of a plurality B of base stations are configured to process the received signals. Processing element 201.s associated with an $s^{th}$ base station illustrates details that are common to all of the processing elements 201.1-201.B.

A plurality of time-advance blocks 202.1-202.L advances the signal received by antenna a in accordance with multipath time offsets for the first of a plurality of transmit antennas. Weighting modules 202.1-202.L apply channel weights to the time-advanced signals to produce weighted signals corresponding to the first of the plurality of transmit antennas. A combiner 203 combines the weighted signals to produce a combined signal corresponding to the first of the plurality of transmit antennas. Combined signals corresponding to each of the plurality of transmit antennas are combined 204 to yield a combined output for the $a^{th}$ antenna $$y_{a,s}^{mrc}(t) = \frac{1}{E_s} \sum_{n=1}^{N} \sum_{l=1}^{L_{a,s,n}} \hat{w}_{s,n}^* \alpha_{a,s,n,l}^* y_a(t + \tau_{a,s,n,l}),$$ Equation 2 where $$E_s = \sqrt{\sum_{n=1}^{N} \sum_{l=1}^{L_{a,s,n}} |\hat{w}_{s,n} \alpha_{a,s,n,l}|^2}.$$

Figure 3:
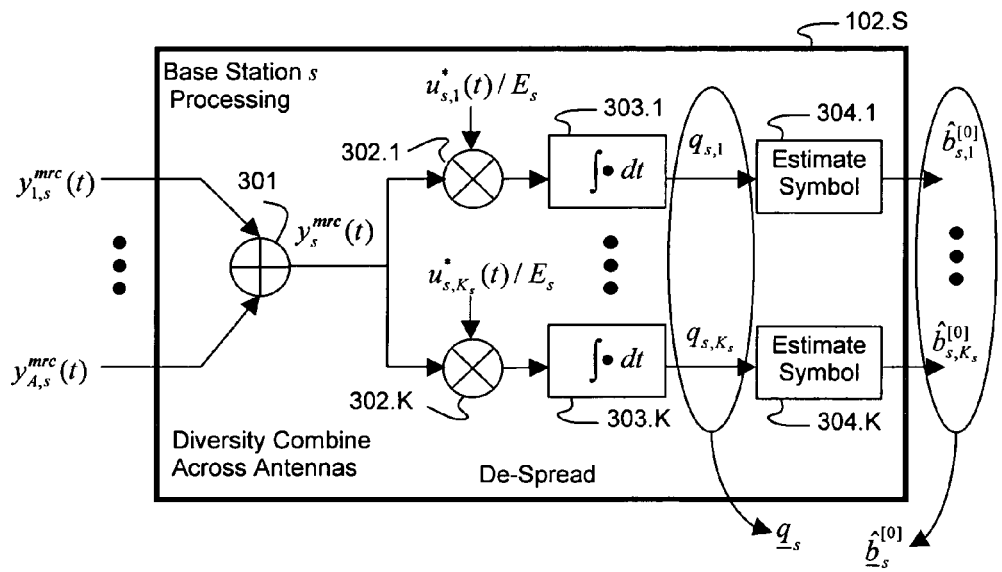
FIG. 3 is a block diagram of module 102.$s$ (shown in FIG. 1), configured for performing per base-station, front-end combining across antennas, de-spreading, and calculating initial symbol estimates.

FIG. 3 illustrates details of module 102.s (shown in FIG. 1), which is configured for implementing combining across paths, de-spreading, and symbol estimation. A combiner 301 sums the signals over all of the receive antennas to produce the combined signal for base station s over all paths and all antennas, $$y_s^{mrc}(t) = \sum_{a=1}^{A} y_{a,s}^{mrc}(t).$$ Equation 3

This combined signal is resolved onto user code waveforms by a despreader comprising code multipliers 302.1-302.K and integrators 303.1-303.K to produce a Rake/Combine/De-Spread output for the $k^{th}$ user of base station s $$q_{s,k} \equiv \frac{1}{E_s} \int_0^T u_{s,k}^*(t) y_s^{mrc}(t) dt$$ Equation 4

The outputs for different users may be stacked to produce a column vector $$\underline{q}_s = [q_{s,1} \; q_{s,2} \; \ldots \; q_{s,K_s}]^T,$$ Equation 5 where the superscript T denotes matrix transpose for base station s. Finally, each $q_{s,k}$ is processed by a symbol estimator 304.1-304.K to produce $$\hat{b}_{s,k}^{[0]} = \text{Estimate Symbol}\{q_{s,k}\},$$ Equation 6 where the superscript [0] indicates the initial symbol estimate produced by front-end processing. A vector of symbol estimates for base station s may be generated as $$\underline{\hat{b}}_s^{[0]} = [\hat{b}_{s,1}^{[0]} \; \hat{b}_{s,2}^{[0]} \; \ldots \; \hat{b}_{s,K_s}^{[0]}]^T.$$

It should be appreciated that each of the functions described with respect to FIG. 3 may be implemented on discrete-time sequences derived from continuous waveforms. More specifically, time advances (or delays) of waveforms becomes shifts by an integer number of samples in discrete-time sequences, and integration becomes summation. This point holds for all such functions described herein.

Figure 4:
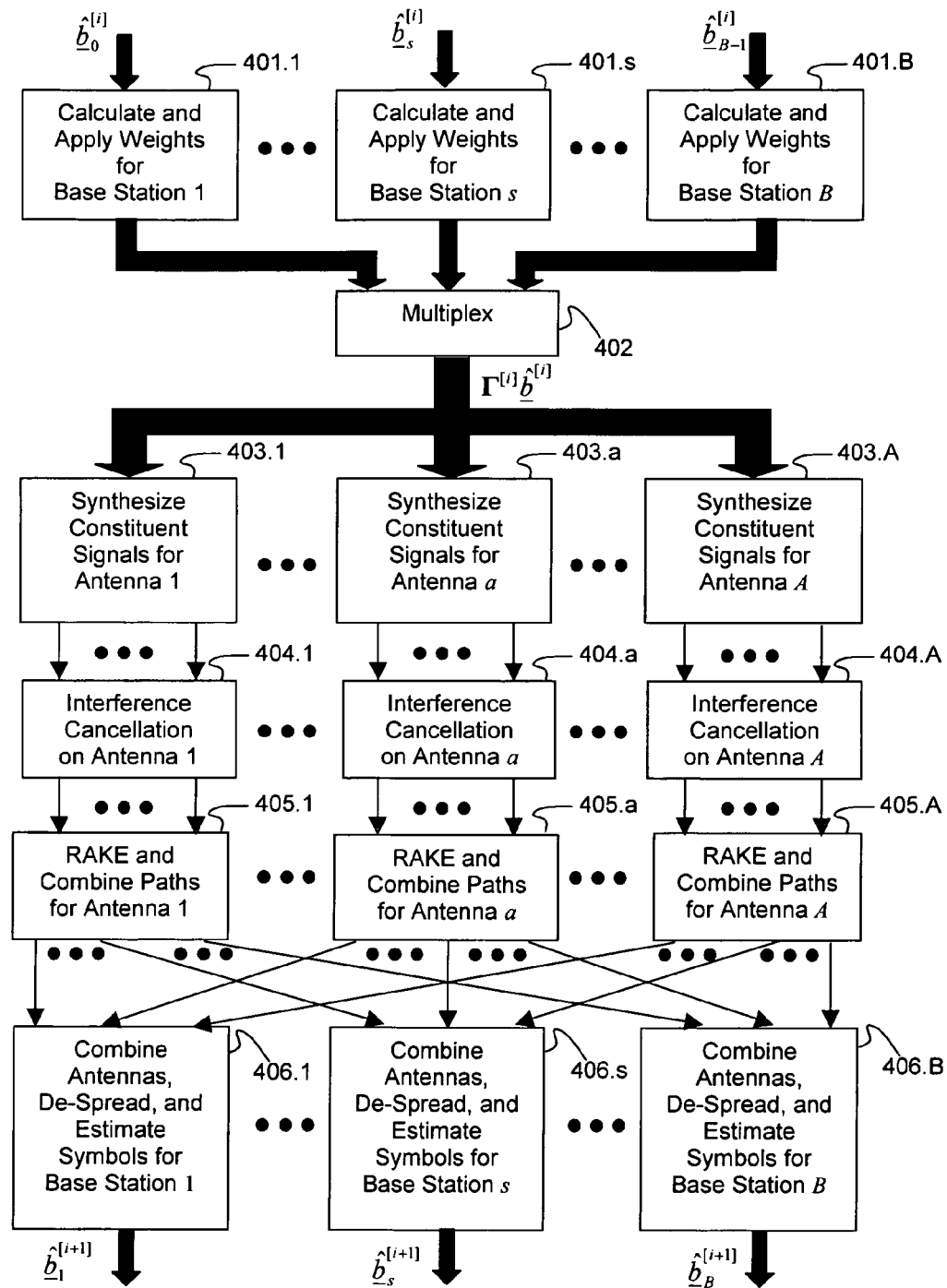
FIG. 4 is a general schematic of an interference cancellation unit configured to process signals from multiple receive antennas.

FIG. 4 illustrates an interference-cancellation method that may be performed by an ICU, such as ICU 104.1. Although ICUs described in U.S. patent application Ser. No. 11/451,688 consider a system having a single receive antenna, the method illustrated in FIG. 4 shows how to condition the plurality of received antenna signals for a parallel bank of ICUs, and how to condition their outputs prior to making symbol estimates.

The inputs into the ICU are symbol estimates for all of the base stations, which are weighted 401.1-401.B according to the perceived quality of the estimates using any of the soft-weighting methods described in U.S. patent application Ser. No. 11/451,688. The weighting of the $k^{th}$ user of base station s is expressed by $$\gamma_{s,k}^{[i]} \hat{b}_{s,k}^{[i]},$$ Equation 7 where $\hat{b}_{s,k}^{[i]}$ is the input symbol estimate and $\gamma_{s,k}^{[i]}$ is its weighting factor. The superscript [i] represents the output of the $i^{th}$ ICU, with [i=0] representing the front-end processing output prior to the first ICU. The symbol estimates may be concatenated 402 into a single column vector $$\underline{\hat{b}}^{[i]} = \left[ (\underline{\hat{b}}_1^{[i]})^T \; (\underline{\hat{b}}_2^{[i]})^T \ldots (\underline{\hat{b}}_B^{[i]})^T \right]^T$$

so that the weighted symbol estimates are given by $\Gamma^{[i]} \underline{\hat{b}}^{[i]}$, where $\Gamma^{[i]}$ is a diagonal matrix containing the weighting factors along its main diagonal.

The weighted symbol estimates $\Gamma^{[i]} \underline{\hat{b}}^{[i]}$ are used to synthesize 403.1-403.A a set of constituent signals for each antenna If the constituent signals for a given antenna were summed, the result would be an estimate of a signal received by antenna a (without noise) if the elements of $\Gamma^{[i]}\underline{\hat{b}}^{[i]}$ were transmitted by the plurality of transmit antennas.

For each antenna, interference cancellation 404.1-404.A is performed on the constituent signals to reduce intra-channel and inter-channel interference. Per-antenna Rake processing and combining 405.1-405.A are performed on the resulting interference-cancelled constituents. Outputs from Rake processing and combining 405.1-405.A are organized by base station, combined across antennas, resolved onto the users' code waveforms, and processed by symbol estimators 406.1-406.B to produce estimated symbols $\hat{b}_{s,k}^{[i+1]}$ for the $k^{th}$ user of base station s after processing by the $(i+1)^{th}$ ICU.

Figure 5A:
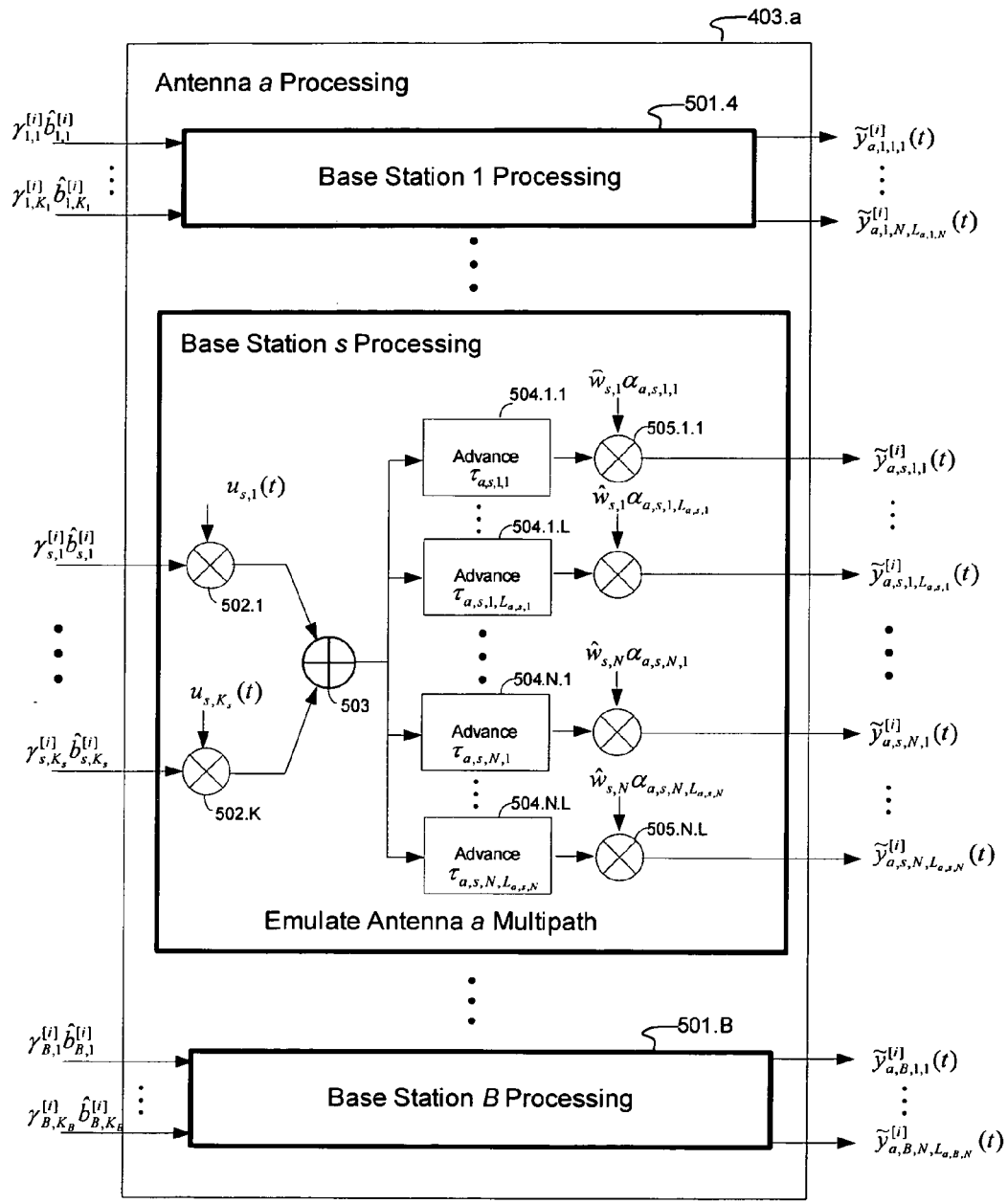
FIG. 5a illustrates an apparatus configured for generating multipath finger constituent signals.

FIG. 5a illustrates an apparatus configured for generating multipath finger constituent signals 403.a. A plurality of base-station processing modules 501.1-501.B are configured for processing the weighted symbol estimates $\Gamma^{[i]}\underline{\hat{b}}^{[i]}$. Processing module 501.s shows details that are common to the other processing modules 501.1-501.B.

Code multipliers 502.1-502.K produce estimated transmit signals by scaling each of a plurality of code waveforms with a corresponding weighted symbol estimate. A combiner 503 combines the estimated transmit signals to produce a superposition signal $$\sum_{k=0}^{K_{(s)}-1} \gamma_{s,k}^{[i]} \hat{b}_{s,k}^{[i]} u_{s,k}(t). \quad \text{Equation 8}$$

A multipath channel emulator is configured to process the superposition signal for the channel between the $n^{th}$ transmit antenna of base station s and the $a^{th}$ antenna of the receiver. The multipath channel emulator comprises a plurality of time-advance modules 504.1.1-504.N.L and weighting modules 505.1.1-505.N.L, which produce multipath finger constituent signals $$\tilde{y}_{a,s,n,l}^{[i]}(t) \equiv \hat{w}_{s,n} \alpha_{a,s,n,l} \sum_{k=0}^{K_s-1} \gamma_{s,k}^{[i]} \hat{b}_{s,k}^{[i]} u_{s,k}(t - \tau_{a,s,l}) \quad \text{Equation 9}$$

expressing the $l^{th}$ finger constituent for the channel between the $n^{th}$ transmit antenna of base station s and the $a^{th}$ receive antenna of the mobile.

Figure 5B:
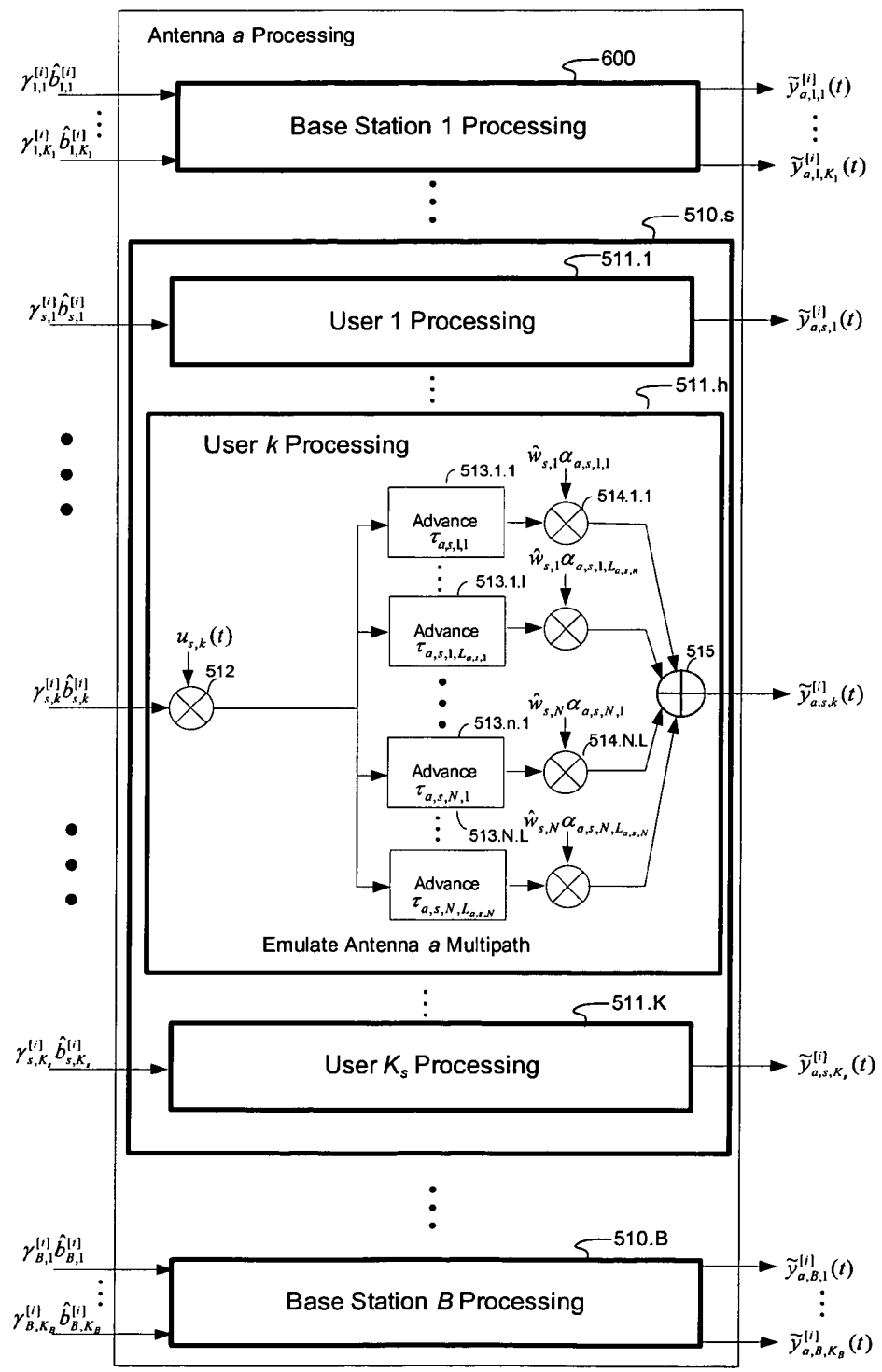
FIG. 5b illustrates an apparatus configured for generating user constituent signals

FIG. 5b illustrates an apparatus configured for generating user constituent signals 403.a for antenna a. A plurality of processors 510.1-510.B are provided for processing signals for each base station. Each base station processor 510.1-510.B comprises a plurality $K_s$ of user-signal processors 511.1-511.K for each user, such as shown in detail with respect to processor 510.s.

User processor 511.k shows details that are common to each of the K user processors 511.1-511.K. A code multiplier 512 modulates the weighted symbol onto user k's code waveform. The modulated waveform is processed by a multipath channel emulator comprising time-advance modules 513.1.1-513.N.L and complex channel gain modules 514.1.1-514.N.L. A combiner 515 sums the emulated multipath signals to produce $$\tilde{y}_{a,s,k}^{[i]}(t) \equiv \gamma_{s,k}^{[i]} \hat{b}_{s,k}^{[i]} \sum_{n=1}^{N} \sum_{l=1}^{L_{a,s,n}} \hat{w}_{s,n} \alpha_{a,s,n,l} u_{s,k}(t - \tau_{a,s,n,l}), \quad \text{Equation 10}$$

which is the synthesized constituent signal for the $k^{th}$ user of base station s at the $a^{th}$ receive antenna. Note that Equation 9 employs a four-parameter subscript with n and l denoting transmit antenna number and multipath within the channel defined by the transmit-receive antenna pair, respectively, whereas Equation 10 uses a three-parameter subscript with the subscript k denoting a user constituent.

The constituent signals for each antenna are processed via interference cancellation 404.1-404.A. Interference cancellation described in U.S. patent application Ser. No. 11/451,688 for a single antenna may be adapted for embodiments of the present invention in which a plurality of receive antennas are employed and the number of paths are increased due to transmit diversity.

Figure 6A:
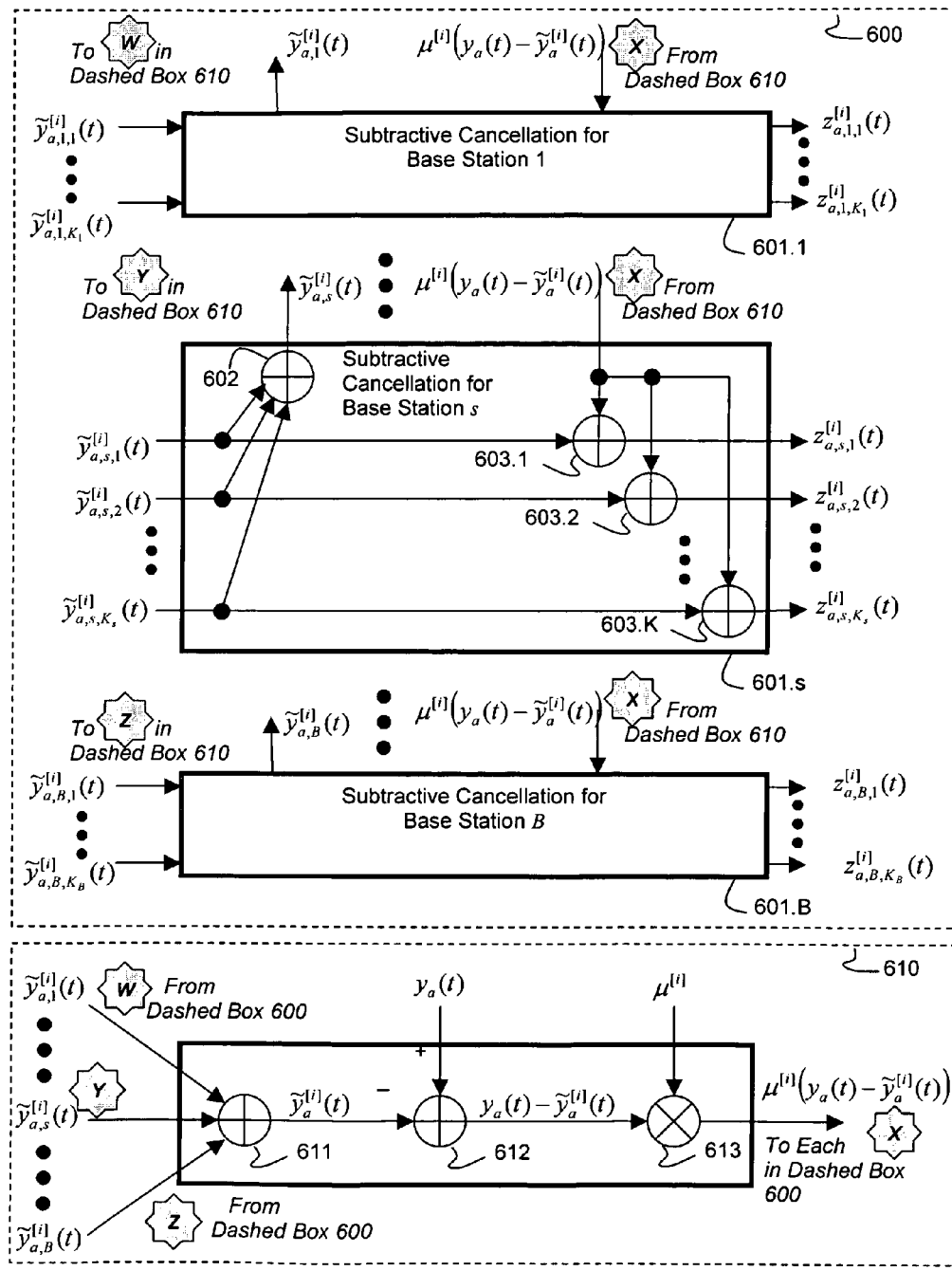
FIG. 6a is a block diagram of an ICU configured to process user constituent signals.

FIG. 6a is a block diagram of an ICU configured to process user constituent signals. Inside synthesis block 600, a plurality B of base station processors 601.1-601.B are configured to process the user constituent signals. For example, a combiner 602 sums user constituent signals associated with base station s to produce a synthesized received signal, $$\tilde{y}_{a,s}^{[i]} \equiv \sum_{k=1}^{K_s} \tilde{y}_{a,s,k}^{[i]},$$

where $\tilde{y}_{a,s,k}^{[i]}$ is the $k^{th}$ user constituent signal from base station s received on the $a^{th}$ receive antenna of the mobile.

Synthesized received signals corresponding to other base stations are coupled into a cancellation block 610, which comprises a combiner 611 that sums the synthesized received signals to produce a combined synthesized received signal, $$\tilde{y}_a^{[i]}(t) = \sum_{s=1}^{B} \tilde{y}_{a,s}^{[i]}(t),$$

on the $a^{th}$ receive antenna. A subtraction module 612 calculates a difference between the combined synthesized receive signal and the actual received signal to produce a residual, or error, signal $y_a(t) - \tilde{y}_a^{[i]}(t)$, which is scaled by a complex stabilizing step size $\mu^{[i]}$ in step-size module 613 to give $\Xi^{[i](y_a}(t) - \tilde{y}_a^{[i]}(t))$.

The scaled signal $\mu^{[i]}(y_a(t) - \tilde{y}_a^{[i]}(t))$ is returned to the synthesis block 600 and added in parallel to every constituent signal, such as indicated by combiners 603.1-603.K to produce a set of interference-cancelled constituents, given by $$\tilde{z}_{a,s,k}^{[i]}(t) \equiv \tilde{y}_{a,s,k}^{[i]}(t) + \mu^{[i]}(y_a(t) - \tilde{y}_a^{[i]}(t)), \quad \text{Equation 11}$$

which is the interference-cancelled $k^{th}$ constituent signal from base station s received on the $a^{th}$ antenna of the mobile.

Figure 6B:
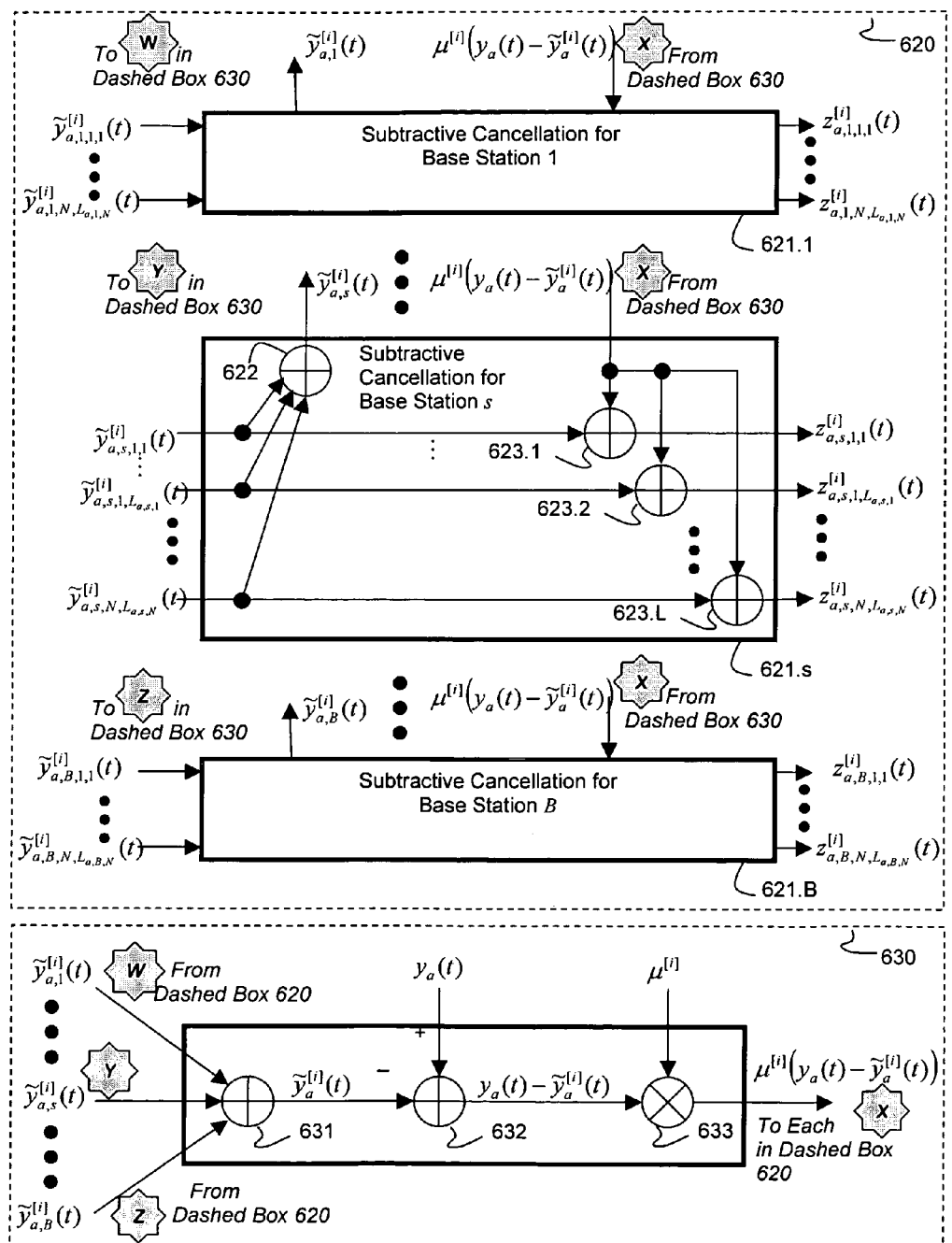
FIG. 6b is a block diagram of an ICU configured to process finger constituent signals.

FIG. 6b is a block diagram of an ICU configured to process finger constituent signals. Inside synthesis block 620, a plurality B of base station processors 621.1-621.B are configured to process the user constituent signals. For example, in processor 621.$s$, a combiner 622 sums user constituent signals associated with base station s to produce a synthesized received signal associated with that base station, $$\tilde{y}_{a,s}^{[i]} \equiv \sum_{n=1}^{N} \sum_{l=1}^{L_{a,s,n}} \tilde{y}_{a,s,n,l}^{[i]},$$

where $\tilde{y}_{a,s,n,l}^{[i]}$ is the finger constituent signal on the $a^{th}$ receive antenna corresponding to the $l^{th}$ path from the $n^{th}$ transmit antenna of base station s.

Synthesized received signals corresponding to other base stations are coupled into a cancellation block 630, which comprises a combiner 631 that sums the synthesized received signals to produce a combined synthesized receive signal $$\tilde{y}_a^{[i]}(t) = \sum_{s=1}^{B} \tilde{y}_{a,s}^{[i]}(t)$$

for the $a^{th}$ antenna. A subtraction module 632 calculates the difference between the combined synthesized receive signal and the actual received signal to produce a residual signal, $y_a(t) - \tilde{y}_a^{[i]}(t)$. A step-size module 633 scales the residual signal by a complex stabilizing step size $\mu^{[i]}$ to produce a scaled signal $\mu^{[i]}(y_a(t) - \tilde{y}_a^{[i]}(t))$, which is returned to the synthesis block. The scaled signal $\mu^{[i]}(y_a(t) - \tilde{y}_a^{[i]}(t))$ is added in parallel by combiners 623.1-623.L to each of the constituent signals to produce a set of interference-cancelled constituents. The interference-cancelled constituents are identified by $$z_{a,s,n,l}^{[i]}(t) \equiv \tilde{y}_{a,s,n,l}^{[i]}(t) + \mu^{[i]}(y_a(t) - \tilde{y}_a^{[i]}(t)), \qquad \text{Equation 12}$$

which is the interference-cancelled $(n,l)^{th}$ constituent signal from base station s received on the $a^{th}$ antenna of the mobile.

Figure 7A:
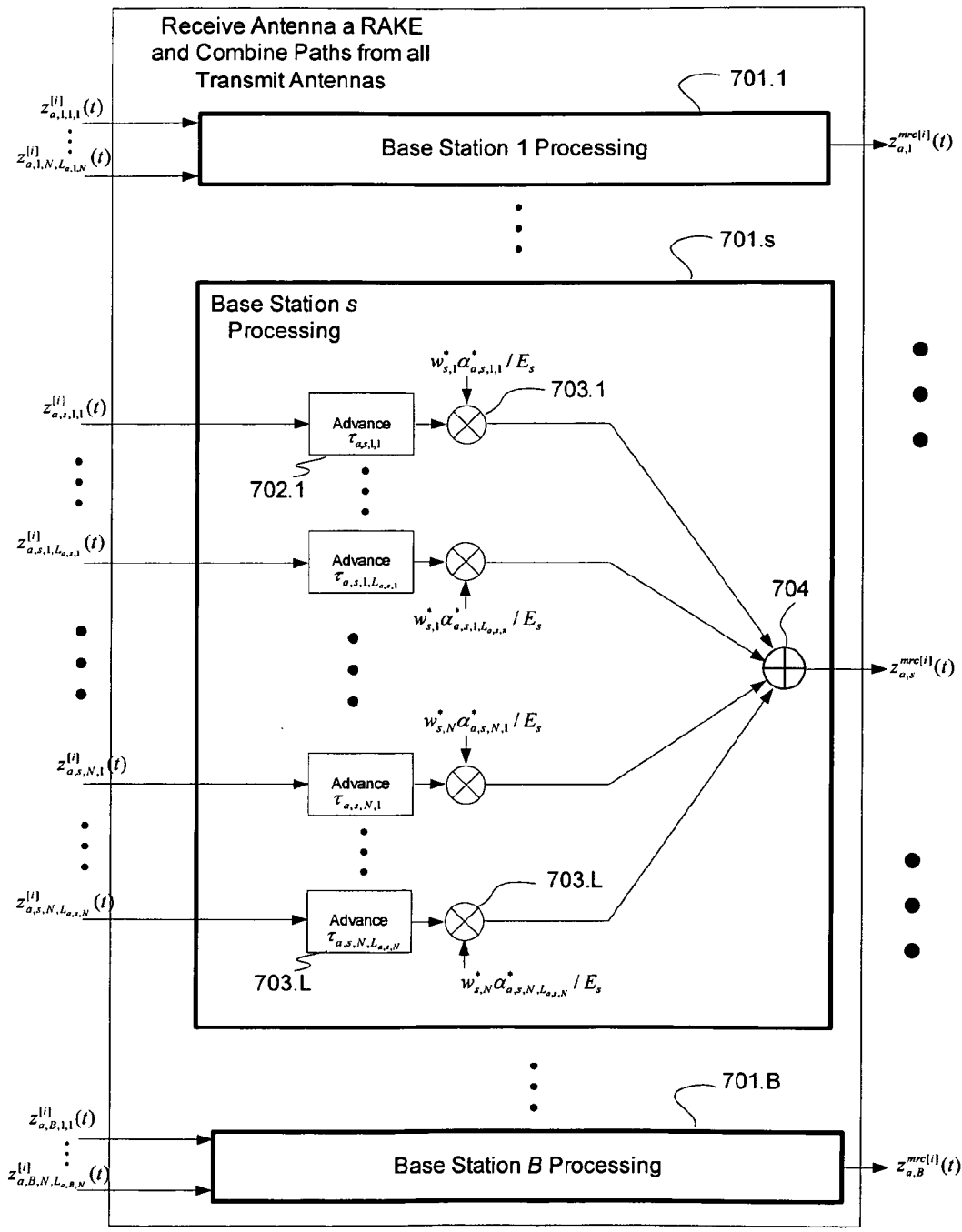
FIG. 7a shows an apparatus configured for performing Rake processing and combining (such as described with respect to steps 405.1-405.A shown in FIG. 4) on interference-cancelled finger constituent signals for each antenna.

FIG. 7*a* shows an apparatus configured for performing Rake processing and combining (such as described with respect to steps 405.1-405.A shown in FIG. 4) on interference-cancelled finger constituent signals for antenna a. A plurality B of base station processing modules 701.1-701.B are configured for processing finger constituents corresponding to signals transmitted from individual base stations. Time-advance modules 702.1-702.L are configured to advance the finger constituent signals by related multipath time shifts. Multipliers 703.1-703.L scale the time-shifted constituent signals by the product of dominant beam weights and complex channel gains relative to each transmit antenna. A combiner 704 sums the scaled, time-shifted signals to produce a maximal ratio combined (MRC) output $$z_{a,s}^{mrc,[i]}(t) \equiv \frac{1}{E_s} \sum_{n=1}^{N} \sum_{l=1}^{L_{a,s,n}} \hat{w}_{s,n}^* \alpha_{a,s,n,l}^* z_{a,s,n,l}(t + \tau_{a,s,n,l}) \qquad \text{Equation 13}$$

associated with receive antenna a and base station s.

Figure 7B:
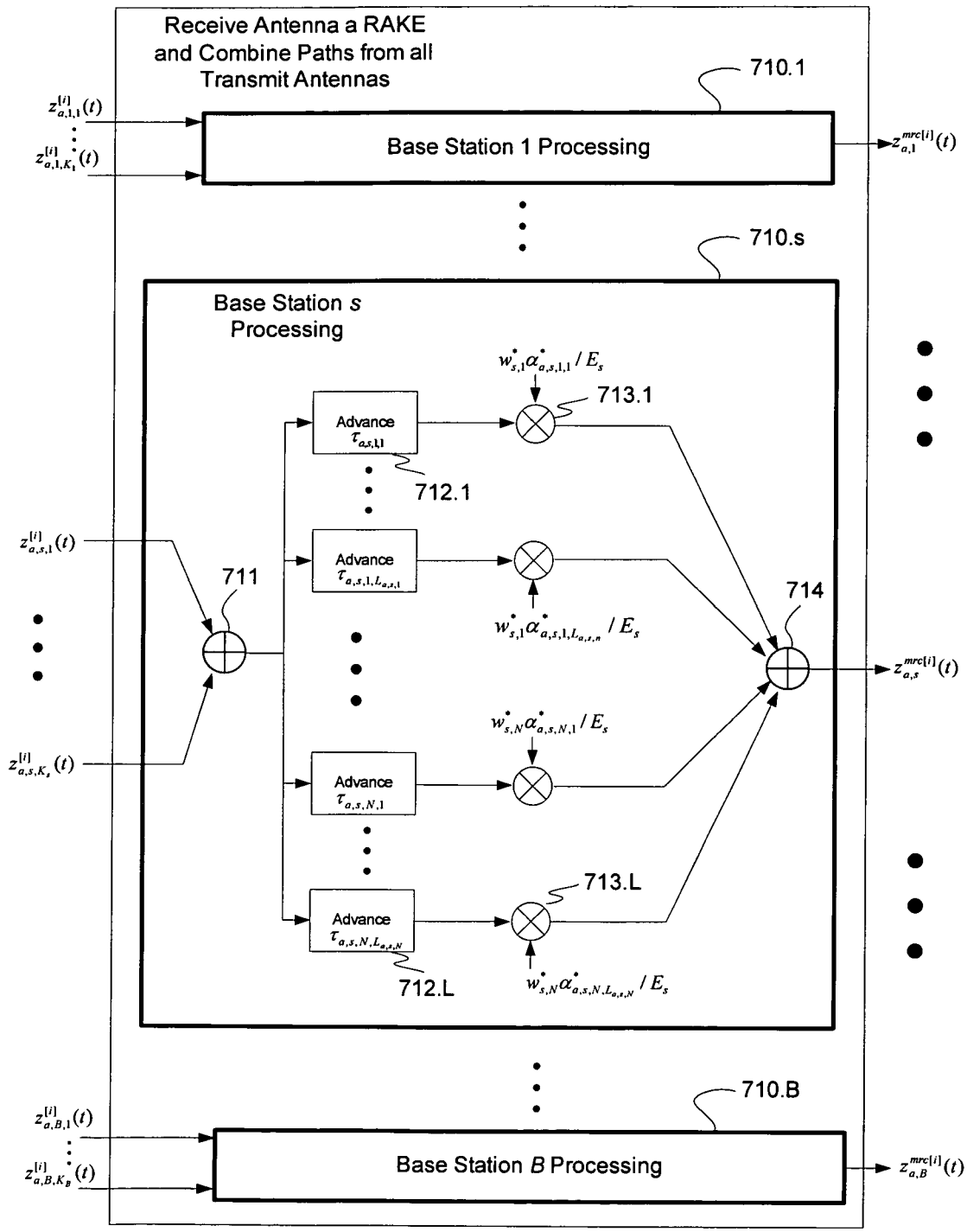
FIG. 7b shows an apparatus configured for performing Rake processing and combining (such as described with respect to steps 405.1-405.A shown in FIG. 4) on interference-cancelled user constituent signals for each antenna.

FIG. 7*b* shows an apparatus configured for performing Rake processing and combining (such as described with respect to steps 405.1-405.A shown in FIG. 4) on interference-cancelled user constituent signals for each antenna. A combiner 711 sums the user constituent signals, and the summed signals are processed by a channel emulator comprising time-advance modules 712.1-712.L and weighting modules 713.1-713.L. The weighting modules 713.1-713.L employ scale factors comprising products of corresponding multipath channel gains and dominant beam weights. A combiner 714 sums the resulting scaled and time-shifted signals to form the MRC output $$z_{a,s}^{mrc,[i]}(t) \equiv \frac{1}{E_s} \sum_{n=1}^{N} \sum_{l=1}^{L_{a,s,n}} \hat{w}_{s,n}^* \alpha_{a,s,n,l}^* \sum_{k=1}^{K_s} z_{a,s,k}(t + \tau_{a,s,n,l}) \qquad \text{Equation 14}$$

associated with receive antenna a and base station s.

Figure 8:
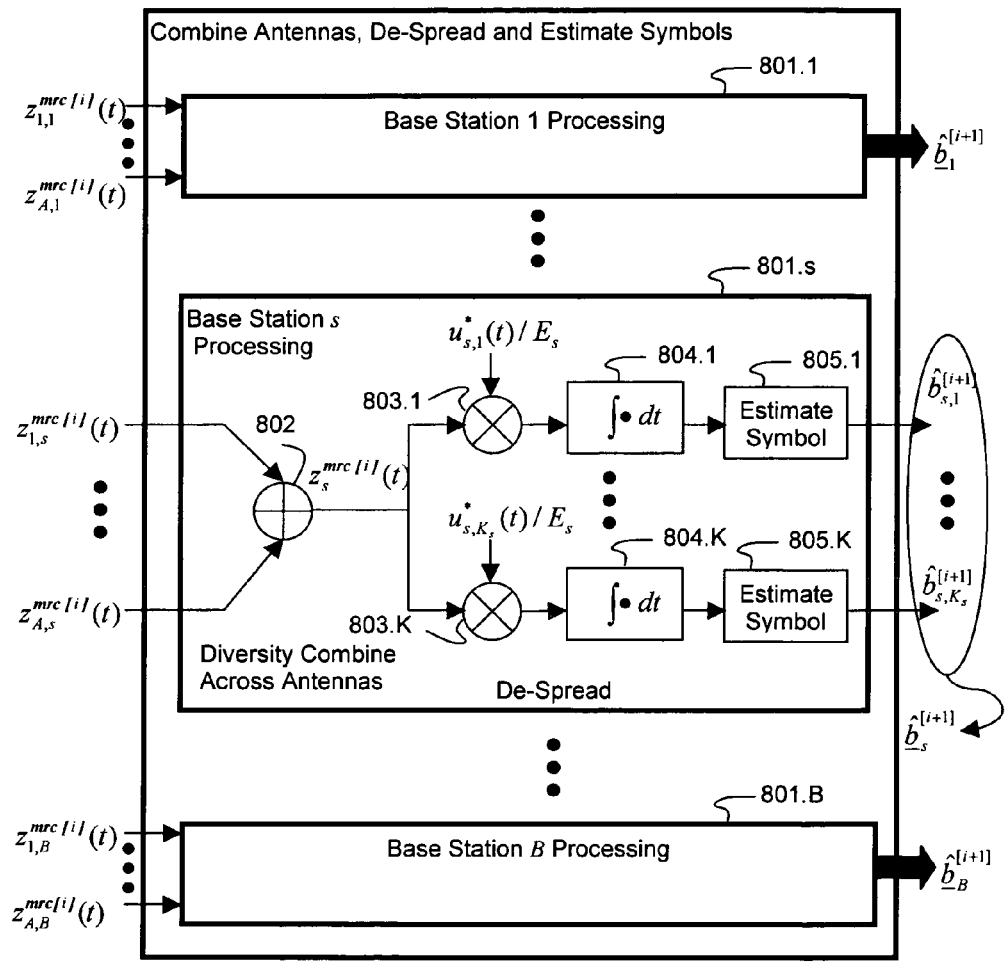
FIG. 8 shows an apparatus configured to produce the updated symbol estimates described with respect to step 406.1-406.B in FIG. 4.

FIG. 8 shows an apparatus configured to produce the updated symbol estimates described with respect to step 406.1-406.B in FIG. 4. A plurality B of processors 801.1-801.B are configured to process the MRC signals for all of the receive antennas. Processor 801.$s$ shows details that are common to all of the processors 801.1-801.B. A combiner 802 sums the MRC signals from base station s to produce an overall MRC signal for base station s $$z_s^{mrc,[i]}(t) \equiv \sum_{a=1}^{A} z_{a,s}^{mrc,[i]}(t), \qquad \text{Equation 15}$$

which is resolved onto the users' code waveforms.

A despreader comprises code multipliers 803.1-803.K and integrators 804.1-804.K. Resolved signals from the despreader are processed by a plurality of symbol estimators 805.1-805.K. Various types of symbol estimators may be employed, including the mixed-decision symbol estimators described in U.S. patent application Ser. No. 11/451,688.

Figure 9A:
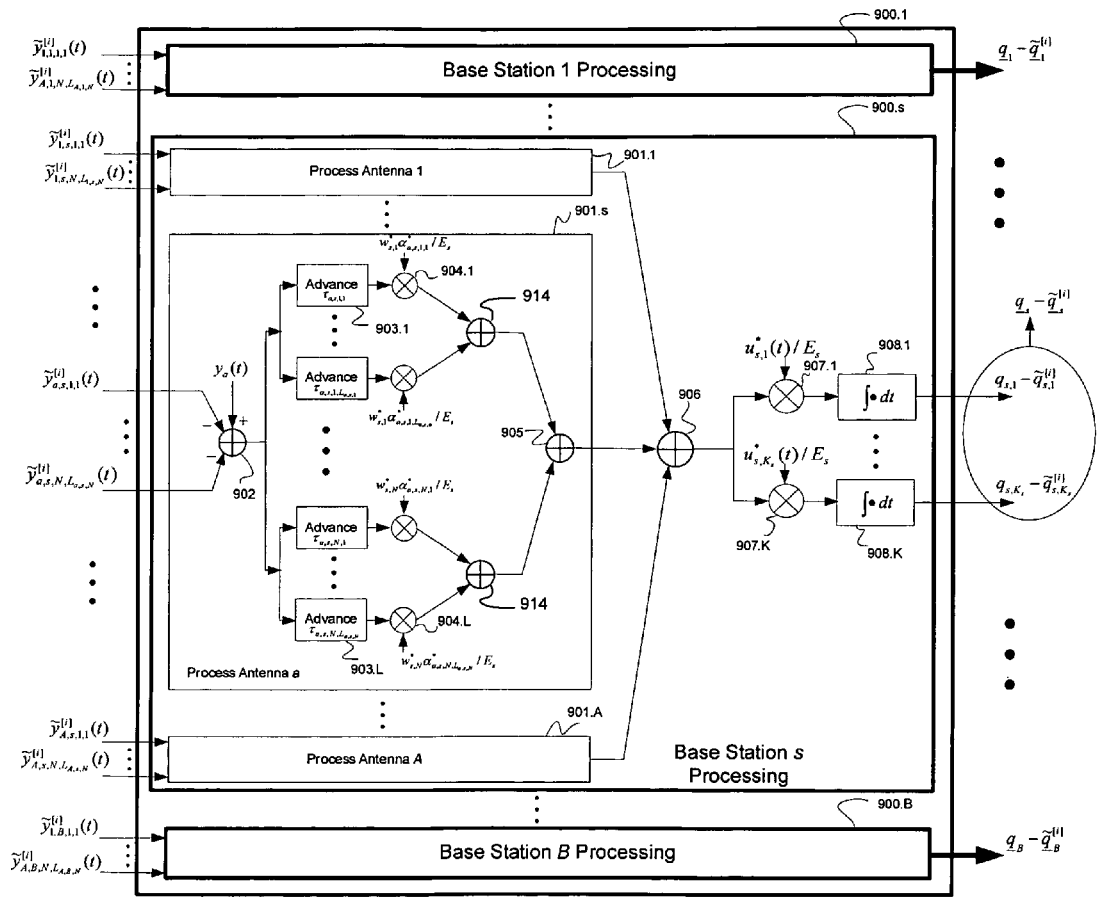
FIG. 9a is a block diagram illustrating an embodiment of an interference cancellation unit wherein subtractive cancellation takes place after signal de-spreading.

Because of the linear nature of many of the blocks in the ICU, it is possible to switch their order of operation without affecting the overall functionality. Thus, alternative embodiments of the invention may include variations and permutations of the functional blocks described herein. In one embodiment, antenna combining and despreading may be performed prior to interference cancellation, such as illustrated in FIG. 9*a*.

Each of a plurality B of processing blocks 900.1-900.B is configured for processing constituent signals that are common to a particular base station. Within each processing block, such as block 900.$s$, is a plurality of processing blocks configured for processing constituent signals for each receive antenna 901.1-901.A. In antenna-processing block 901.$s$, a subtractive canceller 902 subtracts constituent signals for each receive antenna from the received signal $y_a(t)$ on receive antenna a. The resulting residual signal is processed by a Rake with maximal ratio combining, comprising a plurality of time-advance modules 903.1-903.L, weighting modules 904.1-904.L, and combiners 914.1-914.N and 905.

Rake outputs from the antennas are summed 906, and the resulting combined signal is resolved onto the code waveforms of the users associated with the $s^{th}$ base station. A despreader configured to resolve the combined signal may comprise a plurality of code multipliers 907.1-907.K and integrators 908.1-908.K. The output for the $k^{th}$ user of base station s is $q_{s,k} - \tilde{q}_{s,k}^{[i]}$, where $$q_{s,k} = \frac{1}{E_s} \int_0^T u_k^*(t) \sum_{a=1}^A \sum_{n=1}^N \sum_{l=1}^{L_{a,s,n}} \hat{w}_{s,n}^* \alpha_{a,s,n,l}^* y_a(t + \tau_{a,s,n,l}) \, dt,$$

which was defined in Equation 4, and $$\tilde{q}_{s,k} = \frac{1}{E_s} \int_0^T u_k^*(t) \sum_{a=1}^A \sum_{n=1}^N \sum_{l=1}^{L_{a,s,n}} \hat{w}_{s,n}^* \alpha_{a,s,n,l}^* \tilde{y}_a(t + \tau_{a,s,n,l}) \, dt.$$

The values $q_{s,k}$ and $\tilde{q}_{s,k}^{[i]}$ may be stacked into vectors over the user index for each base station/antenna pair to form $\underline{q}_s$–$\underline{\tilde{q}}_s^{[i]}$, where $\underline{q}_s$ is defined in Equation 5. These likewise may be stacked into a single vector over the base station index to give $\underline{q}$–$\underline{\tilde{q}}^{[i]}$. This quantity may also be determined explicitly through a matrix multiplication.

Figure 9B:
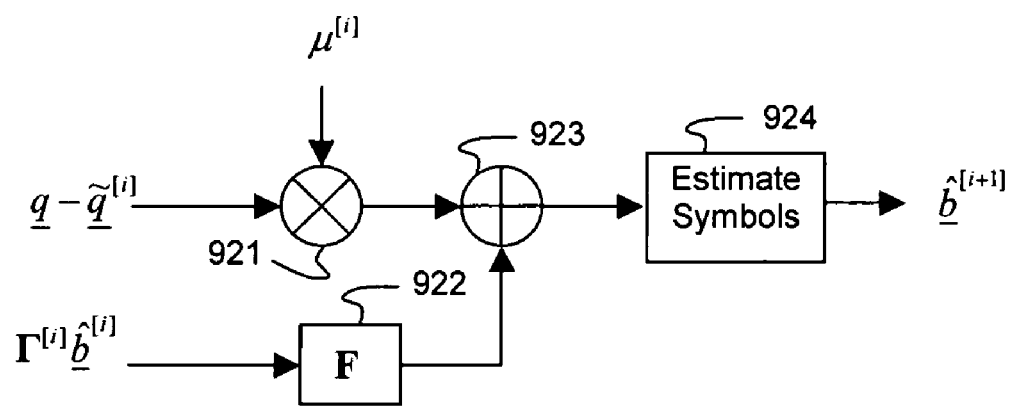
FIG. 9b illustrates the final step performed by an interference cancellation unit.

FIG. 9b illustrates the final step performed by an ICU. The difference signal $\underline{q}$–$\underline{\tilde{q}}^{[i]}$ is scaled 921 by the stabilizing step size $\mu^{[i]}$ and the result is added 923 to the vector $F\Gamma^{[i]}\underline{b}^{[i]}$, where the value of the implementation matrix F depends on whether finger or user constituents are used. Finally, symbol estimates are computed 924 on each element of the vector.

Figure 10:
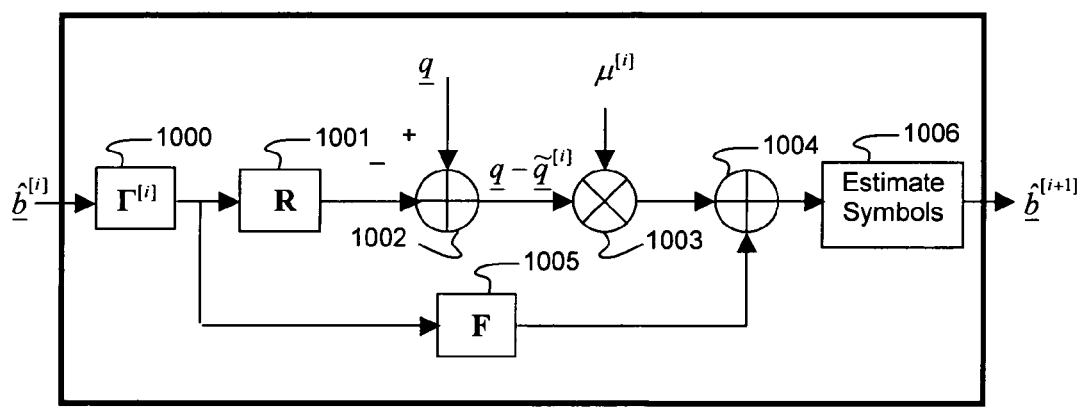
FIG. 10 illustrates an explicit implementation of an interference cancellation unit.

FIG. 10 illustrates an explicit implementation of an ICU. Input symbol estimates are weighted 1000 and multiplied 1001 by a matrix R to produce a vector that is subtracted 1002 from the front-end vector $\underline{q}$ to produce a difference signal. The difference signal is scaled 1003 by the stabilizing step size $\mu^{[i]}$. The weighted symbol estimates are multiplied 1005 by the implementation matrix F, and the resulting weighted vector is added to the scaled difference signal. Finally, symbol estimates are computed 1006 from the elements of the resulting vector.

The matrix R is the users' correlation matrix at the receiver after combining across antennas. It may be evaluated by $$R = \sum_{a=1}^A R_a \qquad \text{Equation 16}$$

where $R_a$ is the users' block correlation matrix at the $a^{th}$ antenna of the receiver with block structure $$R_a = \begin{bmatrix} R_{1,1,a} & R_{1,2,a} & \cdots & R_{1,B,a} \\ R_{2,1,a} & R_{2,2,a} & \cdots & R_{2,B,a} \\ \vdots & \vdots & \ddots & \vdots \\ R_{B,1,a} & R_{B,2,a} & \cdots & R_{B,B,a} \end{bmatrix}.$$

The $(i,j)^{th}$ element of the cross-correlation matrix $R_{s,s',a}$ is given by $$R_{s,s',a,i,j} = \frac{1}{\sqrt{\sum_{n=1}^N \sum_{l=1}^{L_{a,s,n}} |\hat{w}_{s,n} \alpha_{a,s,n,l}|^2 \sum_{n'=1}^N \sum_{l'=1}^{L_{a,s',n'}} |\hat{w}_{s',n'} \alpha_{a,s',n',l'}|^2}} \times$$

-continued $$\int \sum_{n=1}^N \sum_{l=1}^{L_{a,s,n}} \hat{w}_{s,n} \alpha_{a,s,n,l} u_i(t - \tau_{a,s,n,l})$$

$$\sum_{n'=1}^N \sum_{l'=1}^{L_{a,s',n'}} \hat{w}_{s,n'}^* \alpha_{a,s',n',l'}^* u_j^*(t - \tau_{a,s',n',l'}) \, dt,$$

which can be built at the receiver with estimates of the path gains and delays and knowledge of the users' code waveforms for explicit embodiments of the invention. The matrix F is either the identity matrix (when user constituent signals are employed) or the users' correlation matrix at the transmitter when finger constituent signals are used, such as described in U.S. patent application Ser. No. 11/451,688.

The stabilizing step size $\mu^{[i]}$ may take any of the forms described in U.S. patent application Ser. No. 11/451,688 that depend on the correlation matrix R, the implementation matrix F, and the weighting matrix $\Gamma^{[i]}$ as defined above. Two of these forms of $\mu^{[i]}$ are implicitly calculable, such as described in U.S. patent application Ser. No. 11/451,688 for a single receive antenna.

Figure 11A:
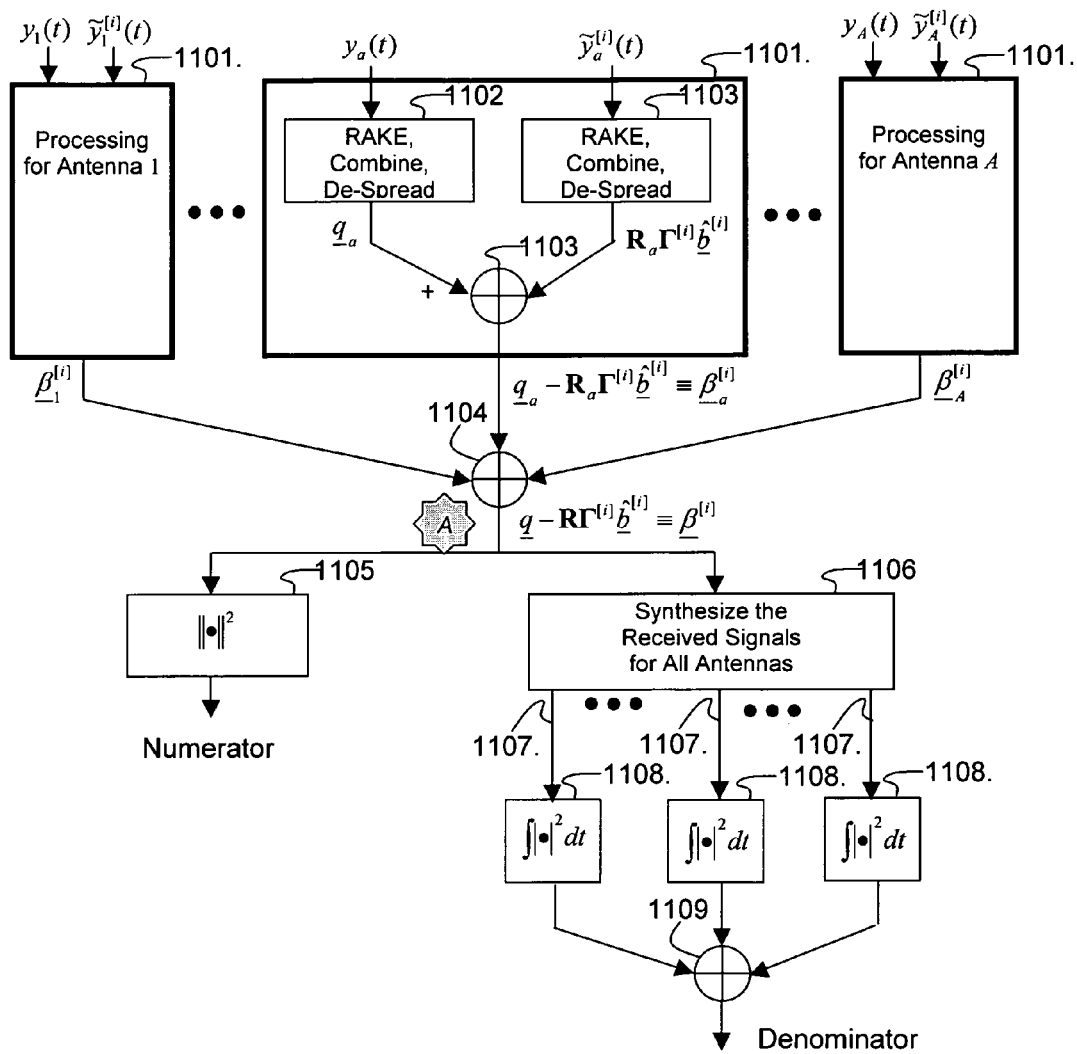
FIG. 11a illustrates a method for calculating the stabilizing step size when multiple receive antennas are employed.
Figure 11B:
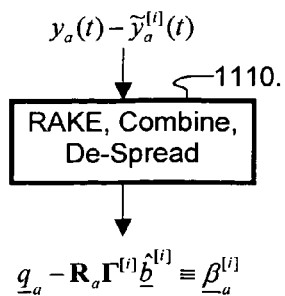

FIG. 11a illustrates a method for calculating the stabilizing step size when multiple receive antennas are employed. A plurality A of processors 1101.1-1101.A, one for each antenna, provides for performing 1102 Rake processing, combining, and de-spreading on the received signal 1102 and also provides for performing 1103 Rake processing, combining, and de-spreading on the synthesized received signal. A difference signal is generated by subtracting 1103 the processed synthesized received signal from the processed received signal. Alternatively, the difference signal may be calculated by first calculating the difference between the received signal and the synthesized received signal prior to Rake processing, combining, and de-spreading, such as shown in FIG. 11b.

The resulting difference-signal vector for the $a^{th}$ antenna is denoted by $\underline{\beta}_a^{[i]}$, and the sum 1104 of difference-signal vectors over all antennas gives $\underline{\beta}^{[i]}$. A sum of square magnitudes 1105 of the elements of $\underline{\beta}^{[i]}$ (i.e., $\|\underline{\beta}^{[i]}\|^2$) gives a numerator for a ratio expressing the stabilizing step size. The elements of $\underline{\beta}^{[i]}$ are used as transmit symbols in a synthesis process 1106 that synthesizes received signals for each antenna. The resulting synthesized outputs 1107.1-1107.A are equal to $$\sum_{s=1}^B \sum_{n=1}^N \sum_{l=1}^{L_{a,s,n}} \hat{w}_{s,n} \alpha_{a,s,n,l} \sum_{k=1}^{K_s} \beta_{s,k}^{[i]} u_{s,k}(t - \tau_{a,s,n,l})$$

for antenna a, where $\beta_{s,k}^{[i]}$ is the $k^{th}$ element of $\underline{\beta}^{[i]}$. The integral of the square magnitude of each of these synthesized signals is calculated 1108.1-1108.A and summed 1109 to provide a denominator of the ratio. The ratio of the numerator and the denominator gives the first version of the step size $\mu^{[i]}$.

Figure 11C:
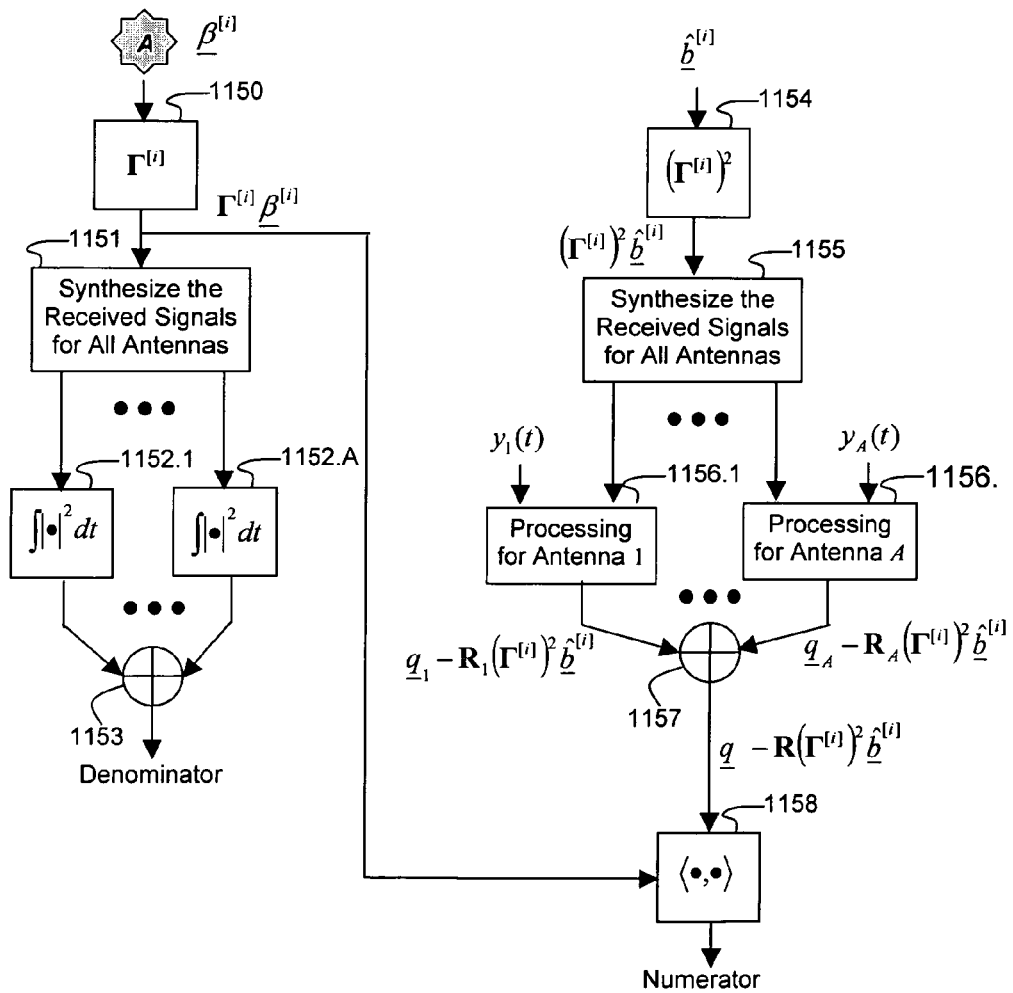
FIG. 11c illustrates a method for implicitly calculating a stabilizing step size.

An implicit evaluation of a second version of the step size is illustrated in FIG. 11c. It too forms a denominator and a numerator in order to calculate the step size. To find the denominator, the vector $\underline{\beta}^{[i]}$ found in FIG. 11a is scaled 1150 by the soft weights (as contained in the diagonal matrix $\Gamma^{[i]}$). The elements of the resulting vector are used to synthesize 1151 received signals for all of the antennas, such as described with respect to step 1106 in FIG. 11a. Integrals of the square magnitudes of the synthesized signals are calculated 1152.1-1152.A and summed 1153 to produce the denominator.

The symbol estimates after the $i^{th}$ iteration are scaled 1154 by the square of the soft weights (as contained in the diagonal matrix $(\Gamma^{[i]})^2$) to produce a weighted symbol vector, which is used to synthesize 1156 received signals for all of the antennas, such as described with respect to step 1106 in FIG. 11a. The received signal and the synthesized received signals are processed 1156.1-1156.A relative to each antenna. The functionality of the processing 1156.1-1156.A is equivalent to that shown in 1101.a of FIG. 11a, which comprises Rake processing, combining, de-spreading, and a difference operation. The vector outputs of the antenna processing 1156.1-1156.A are summed 1157, and the numerator is calculated from the inner product 1158 of this vector with the output vector of step 1150. The ratio of the numerator and denominator terms gives the second version of the step size.

Explicit versions of both versions of the step size are given, respectively, by $$\mu^{[i]} = \frac{\left(\underline{q} - RF\Gamma^{[i]}\underline{\hat{b}}^{[i]}\right)^H \left(\underline{q} - RF\Gamma^{[i]}\underline{\hat{b}}^{[i]}\right)}{\left(\underline{q} - R\Gamma^{[i]}\underline{\hat{b}}^{[i]}\right)^H R\left(\underline{q} - R\Gamma^{[i]}\underline{\hat{b}}^{[i]}\right)} \quad \text{Equation 17}$$

and $$\mu^{[i]} = \frac{\left(\underline{q} - R\Gamma^{[i]}F\Gamma^{[i]}\underline{\hat{b}}^{[i]}\right)^H \Gamma^{[i]}\left(\underline{q} - R\Gamma^{[i]}\underline{\hat{b}}^{[i]}\right)}{\left(\underline{q} - R\Gamma^{[i]}\underline{\hat{b}}^{[i]}\right)^H (\Gamma^{[i]})^H R\Gamma^{[i]}\left(\underline{q} - R\Gamma^{[i]}\underline{\hat{b}}^{[i]}\right)}, \quad \text{Equation 18}$$

wherein all quantities are as previously defined.

Another form of the step size in U.S. patent application Ser. No. 11/451,688 depends only on the path gains, and may be generalized to multiple receive antennas according to $$\mu^{[i]} = \mu = \max\left\{ C, \frac{\max_{s,n,l} \sum_{a=1}^{A} |\hat{w}_{s,n}\alpha_{a,s,n,l}|^p}{\sum_{a=1}^{A}\sum_{s=1}^{B}\sum_{n=1}^{N}\sum_{l=1}^{L_{a,s,n}} |\hat{w}_{s,n}\alpha_{a,s,n,l}|^p} \right\}, \quad \text{Equation 19}$$

where $\mu^{[i]}$ is fixed for every ICU and C and p are non-negative constants.

It is clear that embodiments of the invention may be realized in hardware or software and there are several modifications that can be made to the order of operations and structural flow of the processing. Those skilled in the art should recognize that method and apparatus embodiments described herein may be implemented in a variety of ways, including implementations in hardware, software, firmware, or various combinations thereof. Examples of such hardware may include Application Specific Integrated Circuits (ASICs), Field Programmable Gate Arrays (FPGAs), general-purpose processors, Digital Signal Processors (DSPs), and/or other circuitry. Software and/or firmware implementations of the invention may be implemented via any combination of programming languages, including Java, C, C++, Matlab™, Verilog, VHDL, and/or processor specific machine and assembly languages.

Computer programs (i.e., software and/or firmware) implementing the method of this invention may be distributed to users on a distribution medium such as a SIM card, a USB memory interface, or other computer-readable memory adapted for interfacing with a consumer wireless terminal. Similarly, computer programs may be distributed to users via wired or wireless network interfaces. From there, they will often be copied to a hard disk or a similar intermediate storage medium. When the programs are to be run, they may be loaded either from their distribution medium or their intermediate storage medium into the execution memory of a wireless terminal, configuring an onboard digital computer system (e.g. a microprocessor) to act in accordance with the method of this invention. All these operations are well known to those skilled in the art of computer systems.

The functions of the various elements shown in the drawings, including functional blocks labeled as "modules" may be provided through the use of dedicated hardware, as well as hardware capable of executing software in association with appropriate software. When provided by a processor, the functions may be performed by a single dedicated processor, by a shared processor, or by a plurality of individual processors, some of which may be shared. Moreover, explicit use of the term "processor" or "module" should not be construed to refer exclusively to hardware capable of executing software, and may implicitly include, without limitation, digital signal processor DSP hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

The method and system embodiments described herein merely illustrate particular embodiments of the invention. It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as applying without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. An interference canceller coupled to a plurality of receive antennas configured for receiving signals from a plurality of transmit antennas in a system wherein closed loop transmit waveform shaping is employed, the interference canceller comprising:

a front-end module configured for determining a set of dominant beamforming weights for transmit antennas of each of a plurality of transmit sources; the front-end module comprising,
  a combiner configured for combining signals from the plurality of receive antennas for each of the plurality of transmit sources for producing a plurality of combined signals,
  a despreading module configured for employing the set of dominant beamforming weights and resolving the plurality of combined signals onto a signal basis for the plurality of transmit sources to produce soft symbol estimates, and
  a mixed-decision module configured for performing a mixed decision on each of the soft symbol estimates to produce initial symbol decisions.

2. The interference canceller recited in claim 1, configured for canceling at least one of intra-cell interference and inter-cell interference.

3. The interference canceller recited in claim 1, configured for canceling interference from each of a plurality of base stations.

4. The interference canceller recited in claim 1, further comprising a sequence of interference-cancellation units configured for producing interference-cancelled versions of the initial symbol decisions, the sequence of interference-cancellation units being configured for summing constituent signals for each of the plurality of receive antennas to a corresponding scaled error signal to produce a combined signal, followed by resolving the combined signals across antennas onto the signal basis for the plurality of transmit sources, the resolving being performed with respect to multipath structure determined from the set of dominant beamforming weights.

5. The interference canceller recited in claim 4, wherein the sequence of interference-cancellation units is configured for performing finger-level interference cancellation in a Rake receiver, the sequence of interference-cancellation units comprising:
  a plurality of synthesizers, each corresponding to one of the plurality of receive antennas and configured to produce synthesized Rake finger signals that would be received in response to weighted symbol decisions employed by at least one of the plurality of transmit sources, and
  a subtractive canceller configured for performing per-antenna subtraction of a sum of the synthesized Rake finger signals from a corresponding received signal to produce an error signal.

6. The interference canceller recited in claim 4, wherein the constituent signals comprise received signals on each of a plurality of Rake fingers or received signals associated with each transmit source.

7. The canceller recited in claim 4, wherein each of the sequence of interference-cancellation units comprises:
  a resolving module configured to resolve a residual signal from each of the plurality of antennas onto the signal basis for the plurality of transmit sources for producing a plurality of per-antenna resolved signals,
  a first combiner configured to combine the per-antenna resolved signals for producing a combined signal,
  a step-size module configured to scale the combined signals with a stabilizing step size for producing a scaled signal, and
  a second combiner configured to sum weighted input symbol decisions with the scaled signal for generating a set of interference-cancelled constituents.

8. The canceller recited in claim 1, configured to reside in at least one of a set of devices, the set comprising a subscriber-side device configured for processing forward-link signals, and a server-side device configured for processing reverse-link signals.

9. A method of canceling interference from signals in a plurality of receive antennas received from a plurality of transmit antennas in a system wherein closed loop transmit waveform shaping is employed, the method comprising:
  providing for determining a set of dominant beamforming weights for transmit antennas of each of a plurality of transmit sources, wherein providing for determining the set of dominant beamforming weights comprises:
    providing for combining signals from the plurality of receive antennas for each of the plurality of transmit sources for producing a plurality of combined signals,
    providing for despreading by employing the set of dominant beamforming weights and resolving the plurality of combined signals onto a signal basis for the plurality of transmit sources to produce soft symbol estimates, and
    providing for performing a mixed decision on each of the soft symbol estimates to produce initial symbol decisions.

10. The method recited in claim 9, configured for canceling at least one of intra-cell interference and inter-cell interference.

11. The method recited in claim 9, configured for canceling interference from each of a plurality of base stations.

12. The method recited in claim 9, further comprising providing for sequential interference cancellation to produce interference-cancelled versions of the initial symbol decisions, whereby providing for sequential interference cancellation comprises summing constituent signals for each of the plurality of receive antennas to a corresponding scaled error signal to produce a combined signal, followed by resolving the combined signals across antennas onto the signal basis for the plurality of transmit sources, the resolving being performed with respect to multipath structure determined from the set of dominant beamforming weights.

13. The method recited in claim 12, wherein providing for sequential interference cancellation is configured for performing finger-level interference cancellation in a Rake receiver, the sequence of interference-cancellation units comprising:
  providing for producing synthesized Rake finger signals for each of the plurality of receive antennas, the synthesized Rake finger signals emulating signals that would be received in response to weighted symbol decisions being employed by at least one of the plurality of transmit sources, and
  providing for performing per-antenna subtraction of a sum of the synthesized Rake finger signals from a corresponding received signal to produce an error signal.

14. The method recited in claim 12, wherein the constituent signals comprise received signals on each of a plurality of Rake fingers, or received signals associated with each transmit source.

15. The method recited in claim 12, wherein providing for sequential interference cancellation comprises:
  providing for resolving a residual signal from each of the plurality of antennas onto the signal basis for the plurality of transmit sources for producing a plurality of per-antenna resolved signals,
  providing for combining the per-antenna resolved signals for producing a combined signal,
  providing for scaling the combined signals with a stabilizing step size for producing a scaled signal, and providing for summing weighted input symbol decisions with the scaled signal for generating a set of interference-cancelled constituents.

16. A handset configured to perform the method recited in claim 9.

17. A chipset configured to perform the method recited in claim 9.

18. A digital computer system programmed to perform the method recited in claim 9.

19. A computer-readable medium storing a computer program implementing the method of claim 9.

20. A base station configured to perform the method of claim 9.

21. A system configured for canceling interference from signals in a plurality of receive antennas received from a plurality of transmit antennas wherein closed loop transmit waveform shaping is employed, the system comprising:
a calculation means configured for determining a set of dominant beamforming weights for transmit antennas of each of a plurality of transmit sources, the calculation means comprising:
a combining means for combining signals from the plurality of receive antennas for each of the plurality of transmit sources for producing a plurality of combined signals,
a despreading means configured for employing the set of dominant beamforming weights to resolve the plurality of combined signals onto a signal basis for the plurality of transmit sources to produce soft symbol estimates, and
a mixed-decision means for performing a mixed decision on each of the soft symbol estimates to produce initial symbol decisions.

22. The system recited in claim 21, configured for canceling at least one of intra-cell interference and inter-cell interference.

23. The system recited in claim 21, configured for canceling interference from each of a plurality of base stations.

24. The system recited in claim 21, further comprising a sequential interference cancellation means configured for producing interference-cancelled versions of the initial symbol decisions, the sequential interference cancellation means comprising a summing means for summing constituent signals for each of the plurality of receive antennas to a corresponding scaled error signal to produce a combined signal, and a resolving means configured for resolving the combined signals across antennas onto the signal basis for the plurality of transmit sources, whereby the resolving is performed with respect to multipath structure determined from the set of dominant beamforming weights.

25. The system recited in claim 24, wherein the constituent signals comprise received signals on each of a plurality of Rake fingers, or received signals associated with each transmit source.

26. The system recited in claim 24, wherein the sequential interference cancellation means comprises:
a Rake-synthesis means configured for producing synthesized Rake finger signals for each of the plurality of receive antennas, the synthesized Rake finger signals emulating signals that would be received in response to weighted symbol decisions being employed by at least one of the plurality of transmit sources, and
a subtraction means configured for performing per-antenna subtraction of a sum of the synthesized Rake finger signals from a corresponding received signal to produce an error signal.

27. The system recited in claim 24, wherein the sequential interference cancellation means comprises:
a resolving means configured for resolving a residual signal from each of the plurality of antennas onto the signal basis for the plurality of transmit sources for producing a plurality of per-antenna resolved signals,
a combining means configured for combining the per-antenna resolved signals for producing a combined signal,
a stabilizing step size means configured for scaling the combined signals with a stabilizing step size for producing a scaled signal, and
a summing means configured for summing weighted input symbol decisions with the scaled signal for generating a set of interference-cancelled constituents.

28. The system recited in claim 21, configured to reside in at least one of a set of devices, the set comprising a subscriber-side device configured for processing forward-link signals, and a server-side device configured for processing reverse-link signals.

29. An interference canceller coupled to a plurality of receive antennas configured for receiving signals from a plurality of transmit antennas in a system wherein closed loop transmit waveform shaping is employed, the interference canceller comprising:
a front-end module configured for determining a set of dominant beamforming weights for transmit antennas of each of a plurality of transmit sources, the front-end module further configured for generating initial symbol decisions, and
a sequence of interference-cancellation units configured for processing the initial symbol decisions; each of the sequence of interference-cancellation units comprising:
a weighting module configured for applying weights to a plurality of input symbol decisions to produce weighted symbol decisions,
a synthesis block configured for processing the weighted symbol decisions and the set of dominant beamforming weights for generating synthesized constituent signals for each of the plurality of receive antennas,
a subtraction module configured for subtracting the synthesized constituent signals from the received signal to produce residual signals,
a step-size module configured for scaling the residual signals by a stabilizing step size for producing scaled residual signals,
a combining module configured for combining the synthesized constituent signals with the scaled residual signals to produce interference-cancelled constituents,
a despreading module configured for employing the set of dominant beamforming weights and resolving the interference-cancelled constituents onto a signal basis for the plurality of transmit sources to produce soft symbol estimates, and
a mixed-decision module configured for performing a mixed decision on each of the soft symbol estimates to produce updated symbol decisions.

30. The canceller recited in claim 29, configured for canceling at least one of intra-cell interference and inter-cell interference.

31. The canceller recited in claim 29, configured for canceling interference from each of a plurality of base stations.

32. The canceller recited in claim 29, wherein the weighting module is further configured to calculate the weights as scale constants having magnitudes that depend on merits of the input symbol decisions.

33. The canceller recited in claim 29, wherein the step-size module is further configured to calculate the stabilizing step size as a scalar that improves convergence rate for iterative interference cancellation.

34. The canceller recited in claim 29 wherein the mixed-decision module is configured to produce each of the updated symbol decisions, irrespective of other symbol decisions, as a hard decision that quantizes the soft symbol estimates onto a nearby constellation point or a soft decision that scales the soft symbol estimates without quantizing to a constellation point.

35. The canceller recited in claim 29, further comprising a de-bias module configured to remove bias, as computed on the soft symbol estimates, prior to performing the mixed decision.

36. The canceller recited in claim 29, configured for employing a direct implementation of a one-step matrix update equation to perform symbol-level interference cancellation, the direct implementation including an explicit matrix representation of at least one users' received correlation matrix for received signals combined across the plurality of receive antennas, the correlation matrix being calculated with respect to multipath structure determined from the set of dominant beamforming weights, an implementation matrix, a soft-weighting matrix, a de-biasing matrix, and a scalar stabilizing step size.

37. The canceller recited in claim 36, whereby the one-step matrix update equation is expressed by $$\hat{\underline{b}}^{[i+1]} = \Psi\{D^{[i]}(\mu^{[i]}(\underline{q} - R\Gamma^{[i]}\hat{\underline{b}}^{[i]}) + F\Gamma^{[i]}\hat{\underline{b}}^{[i]})\},$$

wherein $\hat{\underline{b}}^{[i]}$ is a column vector containing the input symbol decisions corresponding to each of the plurality of transmit sources after an $i^{th}$ iteration of interference cancellation, $\underline{q}$ is a vector of the soft symbol estimates that have been combined across the plurality of receive antennas, $\mu^{[i]}$ is a scalar stabilizing step, $\Gamma^{[i]}$ is a weighting matrix used for scaling the input symbol decisions, R is a correlation matrix for received signals combined across antennas that is a sum of per-antenna received-signal correlation matrices with respect to multipath structure determined by the set of dominant beamforming weights, F is an implementation matrix, $D^{[i]}$ is a de-biasing matrix, and $\Psi$ is a mixed-decision operator that returns a mixed symbol decision for each element of its input vector to produce the updated symbol decisions, $\hat{\underline{b}}^{[i+1]}$.

38. The canceller of claim 36, wherein the implementation matrix comprises an identity matrix or a correlation matrix.

39. The canceller recited in claim 29, configured to reside in at least one of a set of devices, the set comprising a subscriber-side device configured for processing forward-link signals and a server-side device configured for processing reverse-link signals.

40. An interference cancellation method for processing signals from a plurality of receive antennas configured for receiving signals from a plurality of transmit antennas in a system wherein closed loop transmit waveform shaping is employed, the method comprising:

providing for determining a set of dominant beamforming weights for transmit antennas of each of a plurality of transmit sources, and generating initial symbol decisions, and providing for sequential interference cancellation for processing the initial symbol decisions; whereby providing for sequential interference cancellation comprises:

providing for applying weights to a plurality of input symbol decisions to produce weighted symbol decisions, providing for processing the weighted symbol decisions and the set of dominant beamforming weights for generating synthesized constituent signals for each of the plurality of receive antennas, providing for subtracting the synthesized constituent signals from the received signal to produce residual signals, providing for scaling the residual signals by a stabilizing step size for producing scaled residual signals, providing for combining the synthesized constituent signals with the scaled residual signals to produce interference-cancelled constituents, providing for despreading by employing the set of dominant beamforming weights and resolving the interference-cancelled constituents onto a signal basis for the plurality of transmit sources to produce soft symbol estimates, and providing for performing a mixed decision on each of the soft symbol estimates to produce updated symbol decisions.

41. The method recited in claim 40, configured for cancelling at least one of intra-cell interference and inter-cell interference.

42. The method recited in claim 40, configured for cancelling interference from each of a plurality of base stations.

43. The method recited in claim 40, wherein providing for applying weights is further configured for calculating the weights as scale constants having magnitudes that depend on merits of the input symbol decisions.

44. The method recited in claim 40, wherein providing for scaling is further configured for calculating the stabilizing step size as a scalar that improves convergence rate for iterative interference cancellation.

45. The method recited in claim 40 wherein providing for performing the mixed decision comprises producing each of the updated symbol decisions, irrespective of other symbol decisions, as a hard decision that quantizes the soft symbol estimates onto a nearby constellation point or a soft decision that scales the soft symbol estimates without quantizing to a constellation point.

46. The method recited in claim 40, further comprising removing bias from the soft symbol estimates prior to performing the mixed decision.

47. The method recited in claim 40, configured for employing a direct implementation of a one-step matrix update equation to perform symbol-level interference cancellation, the direct implementation including an explicit matrix representation of at least one users' received correlation matrix for received signals combined across the plurality of receive antennas, the correlation matrix being calculated with respect to multipath structure determined from the set of dominant beamforming weights, an implementation matrix, a soft-weighting matrix, a de-biasing matrix, and a scalar stabilizing step size.

48. The method recited in claim 47, whereby the one-step matrix update equation is expressed by $$\hat{\underline{b}}^{[i+1]} = \Psi\{D^{[i]}(\mu^{[i]}(\underline{q} - R\Gamma^{[i]}\hat{\underline{b}}^{[i]}) + F\Gamma^{[i]}\hat{\underline{b}}^{[i]})\},$$

wherein $\hat{\underline{b}}^{[i]}$ is a column vector containing the input symbol decisions corresponding to each of the plurality of transmit sources after an $i^{th}$ iteration of interference cancellation, q is a vector of the soft symbol estimates that have been combined across the plurality of receive antennas, $\mu^{[i]}$ is a scalar stabilizing step, $\Gamma^{[i]}$ is a weighting matrix used for scaling the input symbol decisions, R is a correlation matrix for received signals combined across antennas that is a sum of per-antenna received-signal correlation matrices with respect to multipath structure determined by the set of dominant beamforming weights, F is an implementation matrix, $D^{[i]}$ is a de-biasing matrix, and $\Psi$ is a mixed-decision operator that returns a mixed symbol decision for each element of its input vector to produce the updated symbol decisions, $\underline{\hat{b}}^{[i+1]}$.

49. The method of claim 47, wherein the implementation matrix comprises an identity matrix or a correlation matrix.

50. A handset configured to perform the method recited in claim 40.

51. A chipset configured to perform the method recited in claim 40.

52. A digital computer system programmed to perform the method recited in claim 40.

53. A computer-readable medium storing a computer program implementing the method of claim 40.

54. A base station configured to perform the method of claim 40.

55. A subscriber-side device configured to perform the method recited in claim 40.

56. A server-side device configured to perform the method recited in claim 40.

57. An interference cancellation system for processing signals from a plurality of receive antennas configured for receiving signals from a plurality of transmit antennas in a system wherein closed loop transmit waveform shaping is employed, the system comprising:
 a calculation means configured for determining a set of dominant beamforming weights for transmit antennas of each of a plurality of transmit sources, and generating initial symbol decisions, and
 a sequential interference cancellation means configured for processing the initial symbol decisions; sequential interference cancellation means comprising:
  a weighting means configured for applying weights to a plurality of input symbol decisions to produce weighted symbol decisions,
  a synthesizing means configured for processing the weighted symbol decisions and the set of dominant beamforming weights for generating synthesized constituent signals for each of the plurality of receive antennas,
  a subtraction means configured for subtracting the synthesized constituent signals from the received signal to produce residual signals,
  a stabilizing step size means configured for scaling the residual signals by a stabilizing step size for producing scaled residual signals,
  a combining means configured for combining the synthesized constituent signals with the scaled residual signals to produce interference-cancelled constituents,
  a despreading means configured for employing the set of dominant beamforming weights and resolving the interference-cancelled constituents onto a signal basis for the plurality of transmit sources to produce soft symbol estimates, and
  a mixed-decision means configured for performing a mixed decision on each of the soft symbol estimates to produce updated symbol decisions.

58. The system recited in claim 57, configured for cancelling at least one of intra-cell interference and inter-cell interference.

59. The system recited in claim 57, configured for cancelling interference from each of a plurality of base stations.

60. The system recited in claim 57, wherein the weighting means is further configured for calculating the weights as scale constants having magnitudes that depend on merits of the input symbol decisions.

61. The system recited in claim 57, wherein the stabilizing step size means is further configured for calculating the stabilizing step size as a scalar that improves convergence rate for iterative interference cancellation.

62. The system recited in claim 57 wherein the mixed-decision means is configured for producing each of the updated symbol decisions, irrespective of other symbol decisions, as a hard decision that quantizes the soft symbol estimates onto a nearby constellation point or a soft decision that scales the soft symbol estimates without quantizing to a constellation point.

63. The system recited in claim 57, further comprising a de-bias means configured for removing bias from the soft symbol estimates prior to performing the mixed decision.

64. The system recited in claim 57, configured for employing a direct implementation of a one-step matrix update equation to perform symbol-level interference cancellation, the direct implementation including an explicit matrix representation of at least one users' received correlation matrix for received signals combined across the plurality of receive antennas, the correlation matrix being calculated with respect to multipath structure determined from the set of dominant beamforming weights, an implementation matrix, a soft-weighting matrix, a de-biasing matrix, and a scalar stabilizing step size.

65. The system recited in claim 64, whereby the one-step matrix update equation is $$\underline{\hat{b}}^{[i+1]} = \Psi\{D^{[i]}(\mu^{[i]}(\underline{q} - R\Gamma^{[i]}\underline{\hat{b}}^{[i]}) + F\Gamma^{[i]}\underline{\hat{b}}^{[i]})\},$$

wherein $\underline{\hat{b}}^{[i]}$ is a column vector containing the input symbol decisions corresponding to each of the plurality of transmit sources after an $i^{th}$ iteration of interference cancellation, q is a vector of the soft symbol estimates that have been combined across the plurality of receive antennas, $\mu^{[i]}$ is a scalar stabilizing step, $\Gamma^{[i]}$ is a weighting matrix used for scaling the input symbol decisions, R is a correlation matrix for received signals combined across antennas that is a sum of per-antenna received-signal correlation matrices with respect to multipath structure determined by the set of dominant beamforming weights, F is an implementation matrix, $D^{[i]}$ is a de-biasing matrix, and $\Psi$ is a mixed-decision operator that returns a mixed symbol decision for each element of its input vector to produce the updated symbol decisions, $\underline{\hat{b}}^{[i+1]}$.

66. The system recited in claim 64, wherein the implementation matrix comprises an identity matrix or a correlation matrix.

67. An interference canceller coupled to a plurality of receive antennas configured for receiving signals from a plurality of transmit antennas in a system wherein closed loop transmit waveform shaping is employed, the interference canceller comprising:
- a front-end module configured for determining a set of dominant beamforming weights for transmit antennas of each of a plurality of transmit sources, the front-end module further configured for generating initial symbol decisions, and
- a sequence of interference-cancellation units configured for processing the initial symbol decisions; each of the sequence of interference-cancellation units comprising:
  - a weighting module configured for applying soft weights to a plurality of input symbol decisions,
  - a mixed decision module configured for performing mixed decisions on soft symbol estimates, and
  - a step-size module configured to scale a residual signal with a stabilizing step size, the step-size module further configured to produce the stabilizing step size with a magnitude representing how far the input symbol decisions are from desired interference-cancelled symbol decisions in a step of iterative interference cancellation.

68. The interference canceller recited in claim 67, wherein the stabilizing step size is measured as a ratio of distance measures between received signals combined across the plurality of receive antennas and synthesized received signals combined across the plurality of receive antennas, the synthesized received signals and combining weights being determined with respect to a multipath structure determined from the set of dominant beamforming weights.

69. The interference canceller recited in claim 68, wherein the ratio comprises a numerator and a denominator, the numerator being calculated by:
- evaluating a residual signal for each of the plurality of receive antennas, the residual signal being a difference between a received signal for one of the plurality of receive antennas and a synthesized received signal for the one of the plurality of receive antennas, the synthesized receive signal comprising multipath structure determined by the set of dominant beamforming weights;
- resolving the residual signal onto a signal basis for the plurality of transmit sources, the signal basis comprising the multipath structure determined by the dominant beamforming weights;
- providing for maximal ratio combining and despreading to produce a plurality of error vectors, each corresponding to one of the plurality of receive antennas;
- summing the plurality of error vectors to produce a total error vector; and
- evaluating a sum of square magnitudes of elements of the total error vector;

the denominator being calculated by:
- synthesizing for each of the plurality of receive antennas a signal that would be received in response to elements of the total error vector being employed as symbols at the plurality of transmit sources,
- using a signal basis for all symbol sources in the channel;
- evaluating an integral of square magnitudes for the synthesized received signal for each of the plurality of receive antennas for producing a plurality of integral values, and
- summing the integral values.

70. The interference canceller recited in claim 69, wherein the stabilizing step size is characterized by $$\mu^{[i]} = \frac{\left(q - RF\Gamma^{[i]}\hat{b}^{[i]}\right)^H \left(q - RF\Gamma^{[i]}\hat{b}^{[i]}\right)}{\left(q - R\Gamma^{[i]}\hat{b}^{[i]}\right)^H R\left(q - R\Gamma^{[i]}\hat{b}^{[i]}\right)},$$

wherein $\mu^{[i]}$ is a stabilizing step size after an $i^{th}$ iteration of the interference canceller; $q$ is a vector of despread received signals that have been combined across the plurality of receive antennas, $\Gamma^{[i]}$ is a weighting matrix for scaling the plurality of input symbol decisions, $\hat{b}^{[i]}$, R is a correlation matrix for received signals combined across the plurality of receive antennas that is a sum of per-antenna received-signal correlation matrices calculated with respect to the multipath structure determined by the set of dominant beamforming weights; F is an implementation matrix that may comprise an identity matrix or a transmit-signal correlation matrix; and superscript H denotes complex-conjugate matrix transposition.

71. The interference canceller recited in claim 67, wherein the step-size module is further configured to measure the stabilizing step size as a ratio of distance measures between received signals combined across the plurality of receive antennas and two differently synthesized received signals combined across the plurality of receive antennas, the synthesized received signals comprising multipath structure determined by the set of dominant beamforming weights.

72. The interference canceller recited in claim 71, wherein the stabilizing step size is a ratio comprising a numerator and a denominator, the step-size module being configured for
- evaluating for each one of the plurality of receive antennas a residual signal as a difference between a received signal on the one of the plurality of receive antennas and a first synthesized received signal for the one of the plurality of receive antennas, the first synthesized received signal comprising multipath structure determined by the set of dominant beamforming weights;
- resolving the residual signal onto a signal basis for the plurality of transmit sources for producing resolved signals, wherein resolving employs the multipath structure determined by the set of dominant beamforming weights;
- maximal ratio combining and despreading the resolved signals to produce a plurality of error vectors;
- summing the plurality of error vectors to produce a first total error vector;
- scaling the input symbol decisions by the square of the soft weights to produce scaled input symbol decisions;
- producing synthesized signals that emulate signals that would be received by the plurality of receive antennas in response to the scaled input symbol decisions being employed as symbols at the plurality of transmit sources;
- evaluating a difference between received signals and the first synthesized received signal for each of the plurality of receive antennas to produce a plurality of error signals;
- resolving each of the plurality of error signals onto a signal basis for the plurality of transmit sources to produce resolved signals, the signal basis employing the multipath structure determined by the set of dominant beamforming weights;
- maximal ratio combining and despreading the resolved signals to produce a plurality of error vectors;
- summing the plurality of error vectors to produce a second total error vector;

calculating the denominator by:
    scaling the first total error vector with the soft weights to produce a scaled error vector;
    producing synthesized signals that would be received by the plurality of receive antennas in response to the scaled error vector being employed as symbols at the plurality of transmit sources, the synthesized signals being determined with respect to the multipath structure determined by the set of dominant beamforming weights; and
    integrating square magnitudes of the synthesized signals for producing integrated signals; and
    summing the integrated signals; and
calculating the numerator by calculating an inner product between the first total error vector scaled by the soft weights and the second total error vector.

73. The interference canceller recited in claim 71, wherein the stabilizing step size is characterized by $$\mu^{[i]} = \frac{\left(\underline{q} - R\Gamma^{[i]} F\Gamma^{[i]} \underline{\hat{b}}^{[i]}\right)^H \Gamma^{[i]} \left(\underline{\hat{q}} - R\Gamma^{[i]} \underline{\hat{b}}^{[i]}\right)}{\left(\underline{q} - R\Gamma^{[i]} \underline{\hat{b}}^{[i]}\right)^H (\Gamma^{[i]})^H R\Gamma^{[i]} \left(\underline{q} - R\Gamma^{[i]} \underline{\hat{b}}^{[i]}\right)}.$$

wherein $\mu^{[i]}$ is a stabilizing step size after an $i^{th}$ iteration of iterative interference cancellation, $\underline{q}$ is a vector representing despread received signals that have been combined across the plurality of receive antennas, $\Gamma^{[i]}$ is a diagonal soft-weighting matrix used for scaling the input symbol decisions $\underline{\hat{b}}^{[i]}$, R is a correlation matrix for received signals combined across the plurality of receive antennas that is a sum of per-antenna received-signal correlation matrices, and is determined with respect to the multipath structure determined by the set of dominant beamforming weights; F is an implementation matrix comprising an identity matrix or a transmit-signal correlation matrix; and superscript H denotes complex-conjugate matrix transposition.

74. The interference canceller recited in claim 67, wherein the step-size module is further configured for measuring the stabilizing step size as a function of channel quality.

75. The interference canceller recited in claim 74, wherein the stabilizing step size is characterized by $$\mu^{[i]} = \mu = \max\left\{C, \left|\frac{\max_{a,s,n,l} |\hat{w}_{s,n} \alpha_{a,s,n,l}|^p}{\sum_{a=1}^{A} \sum_{s=1}^{B} \sum_{n=1}^{N} \sum_{l=1}^{L_{a,s,n}} |\hat{w}_{s,n} \alpha_{a,s,n,l}|^p}\right|^r\right\},$$

where $\mu$ is a stabilizing step size fixed for every iteration, A is a number of receive antennas, B is a number of base stations, $L_{a,s,n}$ is a number of multipaths from a plurality N of transmit antennas of an $s^{th}$ base station received by an $a^{th}$ receive antenna, $\alpha_{a,s,n,l}$ is a multipath gain corresponding to an $l^{th}$ path from an $n^{th}$ transmit antenna of the $s^{th}$ base station received by the $a^{th}$ receive antenna, $\hat{w}_{s,n}$ is a dominant beamforming scalar corresponding to the $n^{th}$ transmit antenna of the $s^{th}$ base station, max { } denotes a maximum function, and C, p, and r are non-negative constants.

76. The interference canceller recited in claim 67, wherein the step-size module is configured to set the stabilizing step to a predetermined fixed value.

77. A method for canceling interference in signals from a plurality of receive antennas configured for receiving transmissions from a plurality of transmit antennas in a system wherein closed loop transmit waveform shaping is employed, the method comprising:
    providing for front-end processing for determining a set of dominant beam forming weights for transmit antennas of each of a plurality of transmit sources, and generating initial symbol decisions, and
    providing for performing sequential interference cancellation on the initial symbol decisions; performing sequential interference cancellation comprising:
        providing for applying soft weights to a plurality of input symbol decisions for producing soft symbol estimates,
        providing for performing mixed decisions on the soft symbol estimates, and
        providing for scaling a residual signal with a stabilizing step size, the step-size having a magnitude representing how far the input symbol decisions are from desired interference-cancelled symbol decisions in a step of iterative interference cancellation.

78. The method recited in claim 77, wherein the stabilizing step size is measured as a ratio of distance measures between received signals combined across the plurality of receive antennas and synthesized received signals combined across the plurality of receive antennas, the synthesized received signals and combining weights being determined with respect to a multipath structure determined from the set of dominant beamforming weights.

79. The method recited in claim 78, wherein the ratio comprises a numerator and a denominator, the numerator being calculated by:
    providing for evaluating a residual signal for each of the plurality of receive antennas, the residual signal being a difference between a received signal for one of the plurality of receive antennas and a synthesized received signal for the one of the plurality of receive antennas, the synthesized receive signal comprising multipath structure determined by the set of dominant beamforming weights;
    providing resolving the residual signal onto a signal basis for the plurality of transmit sources, the signal basis comprising the multipath structure determined by the dominant beamforming weights;
    providing for maximal ratio combining and despreading to produce a plurality of error vectors, each corresponding to one of the plurality of receive antennas;
    providing for summing the plurality of error vectors to produce a total error vector; and
    providing for evaluating a sum of square magnitudes of elements of the total error vector;
the denominator being calculated by:
    providing for synthesizing for each of the plurality of receive antennas a signal that would be received in response to elements of the total error vector being employed as symbols at the plurality of transmit sources,
    providing for using a signal basis for all symbol sources in the channel;
    providing for evaluating an integral of square magnitudes for the synthesized received signal for each of the plurality of receive antennas for producing a plurality of integral values, and
    providing for summing the integral values.

80. The method recited in claim 79, wherein the stabilizing step size is characterized by $$\mu^{[i]} = \frac{\left(\underline{q} - RF\Gamma^{[i]}\hat{\underline{b}}^{[i]}\right)^H \left(\underline{q} - RF\Gamma^{[i]}\hat{\underline{b}}^{[i]}\right)}{\left(\underline{q} - R\Gamma^{[i]}\hat{\underline{b}}^{[i]}\right)^H R\left(\underline{q} - R\Gamma^{[i]}\hat{\underline{b}}^{[i]}\right)},$$

wherein $\mu^{[i]}$ is a stabilizing step size after an $i^{th}$ iteration of the interference canceller; $\underline{q}$ is a vector of despread received signals that have been combined across the plurality of receive antennas, $\Gamma^{[i]}$ is a weighting matrix for scaling the plurality of input symbol decisions, $\hat{\underline{b}}^{[i]}$, R is a correlation matrix for received signals combined across the plurality of receive antennas that is a sum of per-antenna received-signal correlation matrices calculated with respect to the multipath structure determined by the set of dominant beamforming weights; F is an implementation matrix that may comprise an identity matrix or a transmit-signal correlation matrix; and superscript H denotes complex-conjugate matrix transposition.

81. The method recited in claim 77, wherein providing for scaling is further configured to measure the stabilizing step size as a ratio of distance measures between received signals combined across the plurality of receive antennas and two differently synthesized received signals combined across the plurality of receive antennas, the synthesized received signals comprising multipath structure determined by the set of dominant beamforming weights.

82. The method recited in claim 81, wherein the stabilizing step size is a ratio comprising a numerator and a denominator, the providing for scaling further comprising:
   providing for evaluating a residual signal for each one of the plurality of receive antennas, the residual signal being a difference between a received signal on the one of the plurality of receive antennas and a first synthesized received signal for the one of the plurality of receive antennas, the first synthesized received signal comprising multipath structure determined by the set of dominant beamforming weights;
   providing for resolving the residual signal onto a signal basis for the plurality of transmit sources for producing resolved signals, wherein providing for resolving employs the multipath structure determined by the set of dominant beamforming weights;
   providing for maximal ratio combining and despreading of the resolved signals to produce a plurality of error vectors;
   providing for summing the plurality of error vectors to produce a first total error vector;
   providing for scaling the input symbol decisions by the square of the soft weights to produce scaled input symbol decisions;
   providing for producing synthesized signals that emulate signals that would be received by the plurality of receive antennas in response to the scaled input symbol decisions being employed as symbols at the plurality of transmit sources;
   providing for evaluating a difference between received signals and the first synthesized received signal for each of the plurality of receive antennas to produce a plurality of error signals;
   providing for resolving each of the plurality of error signals onto a signal basis for the plurality of transmit sources to produce resolved signals, the signal basis employing the multipath structure determined by the set of dominant beamforming weights;
   providing for performing maximal ratio combining and despreading of the resolved signals to produce a plurality of error vectors;
   providing for summing the plurality of error vectors to produce a second total error vector;
   providing for calculating the denominator by:
      scaling the first total error vector with the soft weights to produce a scaled error vector;
      producing synthesized signals that would be received by the plurality of receive antennas in response to the scaled error vector being employed as symbols at the plurality of transmit sources, the synthesized signals being determined with respect to the multipath structure determined by the set of dominant beamforming weights; and
      integrating square magnitudes of the synthesized signals for producing integrated signals; and
   providing for summing the integrated signals; and
   providing for calculating the numerator by calculating an inner product between the first total error vector scaled by the soft weights and the second total error vector.

83. The method recited in claim 81, wherein the stabilizing step size is characterized by $$\mu^{[i]} = \frac{\left(\underline{q} - R\Gamma^{[i]}F\Gamma^{[i]}\hat{\underline{b}}^{[i]}\right)^H \Gamma^{[i]}\left(\underline{q} - R\Gamma^{[i]}\hat{\underline{b}}^{[i]}\right)}{\left(\underline{q} - R\Gamma^{[i]}\hat{\underline{b}}^{[i]}\right)^H (\Gamma^{[i]})^H R\Gamma^{[i]}\left(\underline{q} - R\Gamma^{[i]}\hat{\underline{b}}^{[i]}\right)}.$$

wherein $\mu^{[i]}$ is a stabilizing step size after an $i^{th}$ iteration of iterative interference cancellation, $\underline{q}$ is a vector representing despread received signals that have been combined across the plurality of receive antennas, $\Gamma^{[i]}$ is a diagonal soft-weighting matrix used for scaling the input symbol decisions $\hat{\underline{b}}^{[i]}$, R is a correlation matrix for received signals combined across the plurality of receive antennas that is a sum of per-antenna received-signal correlation matrices, and is determined with respect to the multipath structure determined by the set of dominant beamforming weights; F is an implementation matrix comprising an identity matrix or a transmit-signal correlation matrix; and superscript H denotes complex-conjugate matrix transposition.

84. The method recited in claim 77, wherein providing for scaling is further configured for measuring the stabilizing step size as a function of channel quality.

85. The method recited in claim 84, wherein the stabilizing step size is characterized by $$\mu^{[i]} = \mu = \max\left\{C, \left|\frac{\max_{a,s,n}|\hat{w}_{s,n}\alpha_{a,s,n,l}|^p}{\sum_{a=1}^{A}\sum_{s=1}^{B}\sum_{n=1}^{N}\sum_{l=1}^{L_{a,s,n}}|\hat{w}_{s,n}\alpha_{a,s,n,l}|^p}\right|^r\right\},$$

where $\mu$ is a stabilizing step size fixed for every iteration, A is a number of receive antennas, B is a number of base stations, $L_{a,s,n}$ is a number of multipaths from a plurality N of transmit antennas of an $s^{th}$ base station received by an $a^{th}$ receive antenna, $\alpha_{a,s,n,l}$ is a multipath gain corresponding to an $l^{th}$ path from an $n^{th}$ transmit antenna of the $s^{th}$ base station received by the $a^{th}$ receive antenna, $\hat{w}_{s,n}$ is a dominant beamforming scalar corresponding to the $n^{th}$ transmit antenna of the $s^{th}$ base station, max { } denotes a maximum function, and C, p, and r are non-negative constants.

86. The method recited in claim 77, wherein providing for scaling is configured to set the stabilizing step to a predetermined fixed value.

87. A handset configured to perform the method recited in claim 77.

88. A chipset configured to perform the method recited in claim 77.

89. A digital computer system programmed to perform the method recited in claim 77.

90. A computer-readable medium storing a computer program implementing the method of claim 77.

91. A base station configured to perform the method of claim 77.

92. A system configured for canceling interference in signals from a plurality of receive antennas receiving transmissions from a plurality of transmit antennas in a system wherein closed loop transmit waveform shaping is employed, the system comprising:
    a front-end processing means configured for determining a set of dominant beamforming weights for transmit antennas of each of a plurality of transmit sources and generating initial symbol decisions, and
    a sequential interference cancellation means configured for operating on the initial symbol decisions; the sequential interference cancellation means comprising:
        a soft-weighting means configured for applying soft weights to a plurality of input symbol decisions for producing soft symbol estimates,
        a mixed-decision means configured for performing mixed decisions on the soft symbol estimates, and
        a stabilizing step size means configured for scaling a residual signal with a stabilizing step size, the step-size having a magnitude representing how far the input symbol decisions are from desired interference-cancelled symbol decisions in a step of iterative interference cancellation.

93. The system recited in claim 92, wherein the stabilizing step size means is configured for measuring the stabilizing step size as a ratio of distance measures between received signals combined across the plurality of receive antennas and synthesized received signals combined across the plurality of receive antennas, the synthesized received signals and combining weights being determined with respect to a multipath structure determined from the set of dominant beamforming weights.

94. The system recited in claim 93, wherein the ratio comprises a numerator and a denominator, the numerator being calculated by:
    providing for evaluating a residual signal for each of the plurality of receive antennas, the residual signal being a difference between a received signal for one of the plurality of receive antennas and a synthesized received signal for the one of the plurality of receive antennas, the synthesized receive signal comprising multipath structure determined by the set of dominant beamforming weights;
    providing resolving the residual signal onto a signal basis for the plurality of transmit sources, the signal basis comprising the multipath structure determined by the dominant beamforming weights;
    providing for maximal ratio combining and despreading to produce a plurality of error vectors, each corresponding to one of the plurality of receive antennas;
    providing for summing the plurality of error vectors to produce a total error vector; and
    providing for evaluating a sum of square magnitudes of elements of the total error vector;

the denominator being calculated by:
    providing for synthesizing for each of the plurality of receive antennas a signal that would be received in response to elements of the total error vector being employed as symbols at the plurality of transmit sources,
    providing for using a signal basis for all symbol sources in the channel;
    providing for evaluating an integral of square magnitudes for the synthesized received signal for each of the plurality of receive antennas for producing a plurality of integral values, and
    providing for summing the integral values.

95. The system recited in claim 94, wherein the stabilizing step size is characterized by $$\mu^{[i]} = \frac{\left(\underline{q} - RF\Gamma^{[i]}\underline{\hat{b}}^{[i]}\right)^H \left(\underline{q} - RF\Gamma^{[i]}\underline{\hat{b}}^{[i]}\right)}{\left(\underline{q} - R\Gamma^{[i]}\underline{\hat{b}}^{[i]}\right)^H R \left(\underline{q} - R\Gamma^{[i]}\underline{\hat{b}}^{[i]}\right)},$$

wherein $\mu^{[i]}$ is a stabilizing step size after an $i^{th}$ iteration of the interference canceller; $\underline{q}$ is a vector of despread received signals that have been combined across the plurality of receive antennas, $\Gamma^{[i]}$ is a weighting matrix for scaling the plurality of input symbol decisions, $\underline{\hat{b}}^{[i]}$, R is a correlation matrix for received signals combined across the plurality of receive antennas that is a sum of per-antenna received-signal correlation matrices calculated with respect to the multipath structure determined by the set of dominant beamforming weights; F is an implementation matrix that may comprise an identity matrix or a transmit-signal correlation matrix; and superscript H denotes complex-conjugate matrix transposition.

96. The system recited in claim 92, wherein the stabilizing step size means is further configured to measure the stabilizing step size as a ratio of distance measures between received signals combined across the plurality of receive antennas and two differently synthesized received signals combined across the plurality of receive antennas, the synthesized received signals comprising multipath structure determined by the set of dominant beamforming weights.

97. The system recited in claim 96, wherein the stabilizing step size is a ratio comprising a numerator and a denominator, the stabilizing step size further configured for:
    providing for evaluating a residual signal for each one of the plurality of receive antennas, the residual signal being a difference between a received signal on the one of the plurality of receive antennas and a first synthesized received signal for the one of the plurality of receive antennas, the first synthesized received signal comprising multipath structure determined by the set of dominant beamforming weights;
    providing for resolving the residual signal onto a signal basis for the plurality of transmit sources for producing resolved signals, wherein providing for resolving employs the multipath structure determined by the set of dominant beamforming weights;
    providing for maximal ratio combining and despreading of the resolved signals to produce a plurality of error vectors;
    providing for summing the plurality of error vectors to produce a first total error vector;
    providing for scaling the input symbol decisions by the square of the soft weights to produce scaled input symbol decisions;

providing for producing synthesized signals that emulate signals that would be received by the plurality of receive antennas in response to the scaled input symbol decisions being employed as symbols at the plurality of transmit sources;

providing for evaluating a difference between received signals and the first synthesized received signal for each of the plurality of receive antennas to produce a plurality of error signals;

providing for resolving each of the plurality of error signals onto a signal basis for the plurality of transmit sources to produce resolved signals, the signal basis employing the multipath structure determined by the set of dominant beamforming weights;

providing for performing maximal ratio combining and despreading of the resolved signals to produce a plurality of error vectors;

providing for summing the plurality of error vectors to produce a second total error vector;

providing for calculating the denominator by:
  scaling the first total error vector with the soft weights to produce a scaled error vector;
  producing synthesized signals that would be received by the plurality of receive antennas in response to the scaled error vector being employed as symbols at the plurality of transmit sources, the synthesized signals being determined with respect to the multipath structure determined by the set of dominant beamforming weights; and
  integrating square magnitudes of the synthesized signals for producing integrated signals; and
providing for summing the integrated signals; and
providing for calculating the numerator by calculating an inner product between the first total error vector scaled by the soft weights and the second total error vector.

98. The system recited in claim 96, wherein the stabilizing step size is characterized by $$\mu^{[i]} = \frac{\left(q - R\Gamma^{[i]}F\Gamma^{[i]}\hat{\underline{b}}^{[i]}\right)^H \Gamma^{[i]}\left(q - R\Gamma^{[i]}\hat{\underline{b}}^{[i]}\right)}{\left(q - R\Gamma^{[i]}\hat{\underline{b}}^{[i]}\right)^H (\Gamma^{[i]})^H R\Gamma^{[i]}\left(q - R\Gamma^{[i]}\hat{\underline{b}}^{[i]}\right)}.$$

wherein $\mu^{[i]}$ is a stabilizing step size after an $i^{th}$ iteration of iterative interference cancellation, $q$ is a vector representing despread received signals that have been combined across the plurality of receive antennas, $\Gamma^{[i]}$ is a diagonal soft-weighting matrix used for scaling the input symbol decisions $\hat{\underline{b}}^{[i]}$, R is a correlation matrix for received signals combined across the plurality of receive antennas that is a sum of per-antenna received-signal correlation matrices, and is determined with respect to the multipath structure determined by the set of dominant beamforming weights; F is an implementation matrix comprising an identity matrix or a transmit-signal correlation matrix; and superscript H denotes complex-conjugate matrix transposition.

99. The system recited in claim 92, wherein the stabilizing step size means is further configured for measuring the stabilizing step size as a function of channel quality.

100. The system recited in claim 99, wherein the stabilizing step size is characterized by $$\mu^{[i]} = \mu = \max\left\{C, \left|\frac{\max\limits_{a,s,n,l}|\hat{w}_{s,n}\alpha_{a,s,n,l}|^p}{\sum\limits_{a=1}^{A}\sum\limits_{s=1}^{B}\sum\limits_{n=1}^{N}\sum\limits_{l=1}^{L_{a,s,n}}|\hat{w}_{s,n}\alpha_{a,s,n,l}|^p}\right|^r\right\},$$

where $\mu$ is a stabilizing step size fixed for every iteration, A is a number of receive antennas, B is a number of base stations, $L_{a,s,n}$ is a number of multipaths from a plurality N of transmit antennas of an $s^{th}$ base station received by an $a^{th}$ receive antenna, $\alpha_{a,s,n,l}$ is a multipath gain corresponding to an $l^{th}$ path from an $n^{th}$ transmit antenna of the $s^{th}$ base station received by the $a^{th}$ receive antenna, $\hat{w}_{s,n}$ is a dominant beamforming scalar corresponding to the $n^{th}$ transmit antenna of the $s^{th}$ base station, max { } denotes a maximum function, and C, p, and r are non-negative constants.

101. The system recited in claim 92, wherein the stabilizing step size means is configured to set the stabilizing step to a predetermined fixed value.

* * * * *